United States Patent [19]
Rao

[11] Patent Number: 6,118,544
[45] Date of Patent: Sep. 12, 2000

[54] IMAGE FORMING APPARATUS FOR PROCESSING ACCORDING TO SEPARATION SHEET

[75] Inventor: Gururaj Rao, Yokohama, Japan

[73] Assignee: Kabushiki Kaisha Toshiba, Kawasaki, Japan

[21] Appl. No.: 08/996,430

[22] Filed: Dec. 22, 1997

[30] Foreign Application Priority Data

Dec. 26, 1996 [JP] Japan ..................................... 8-349040

[51] Int. Cl.7 .............................. B41B 15/00; B41J 15/00; G06F 15/00
[52] U.S. Cl. ........................................................ 358/1.18
[58] Field of Search ............................. 395/117; 358/1.18

[56] References Cited

U.S. PATENT DOCUMENTS

| | | | |
|---|---|---|---|
| 4,034,400 | 7/1977 | Owen et al. ............................. | 358/500 |
| 4,602,776 | 7/1986 | York et al. ................................ | 271/4.01 |
| 4,757,348 | 7/1988 | Rourke et al. ............................. | 399/84 |
| 4,763,161 | 8/1988 | Forest et al. ................................ | 399/84 |
| 5,049,932 | 9/1991 | Sumida .................................... | 399/183 |
| 5,161,037 | 11/1992 | Saito ....................................... | 358/468 |
| 5,438,426 | 8/1995 | Miake et al. ............................. | 358/403 |
| 5,563,986 | 10/1996 | Suzuki .................................... | 395/114 |
| 5,690,329 | 11/1997 | Van Peteghem et al. ............... | 271/227 |
| 5,839,019 | 11/1998 | Ito ............................................ | 399/45 |

FOREIGN PATENT DOCUMENTS

| | | |
|---|---|---|
| 5-112064 | 5/1993 | Japan . |
| 5-289456 | 11/1993 | Japan . |

*Primary Examiner*—Joseph Mancuso
*Assistant Examiner*—F. E. Cooperrider
*Attorney, Agent, or Firm*—Foley & Lardner

[57] ABSTRACT

An image forming apparatus including scanner section for reading an image of documents and an image of a separation sheet, a circuit for recognizing the image of the separation sheet from the image of the documents, a determining circuit for determining a processing for the image of the documents based on the image of the separation sheet, an operation panel for receiving a processing instruction for the image of the documents, and a processing circuit for processing the image of the documents based on the separation sheet and the processing instruction.

9 Claims, 35 Drawing Sheets

| WIDTH INFORMATION (ENCODER OUTPUT) | | | LENGTH INFORMATION (DOCUMENT SET TIME) | DECISION SIZE |
|---|---|---|---|---|
| P01 | P02 | P03 | PT | |
| L | L | L | — | NO DOCUMENT |
| H | L | L | TA5 | A5 |
| H | L | L | TA4R | A4-R |
| H | H | L | TB5 | B5 |
| H | H | L | TB4 | B4 |
| H | H | H | TA4 | A4 |
| H | H | H | TA3 | A3 |
| H | H | H | TSep | SEPARATOR |
FIG. 13
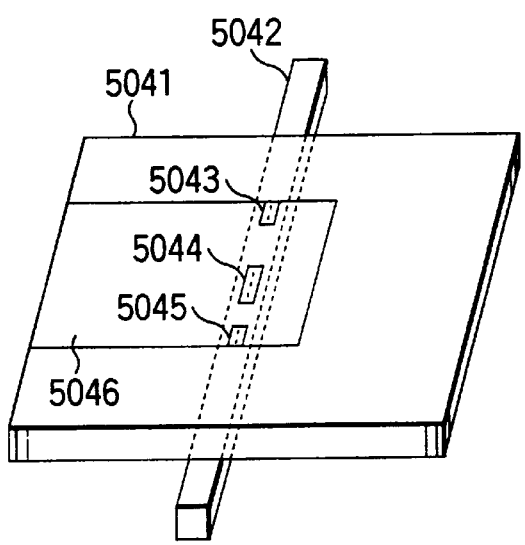
FIG. 14
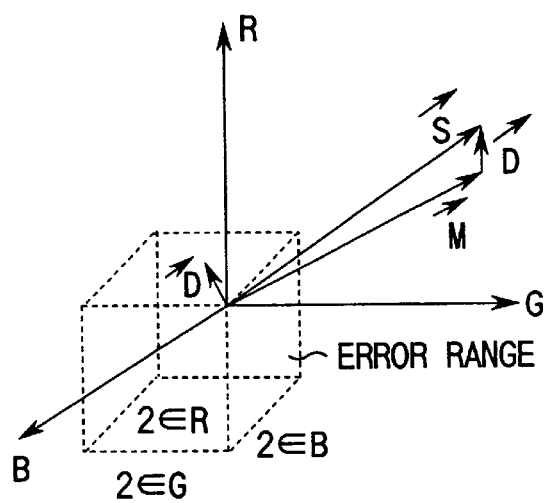
FIG. 15

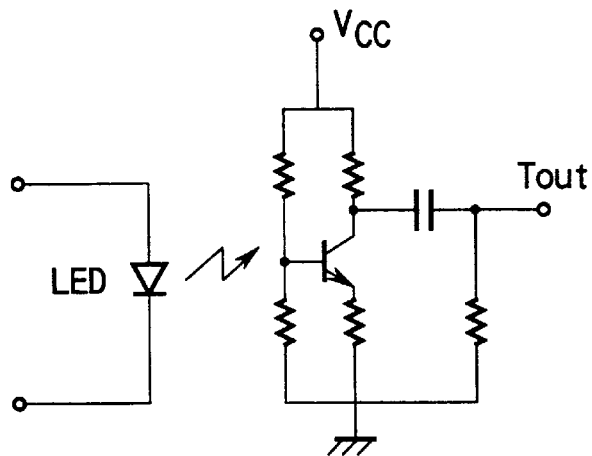
FIG. 16   PHOTO TRANSISTOR AND AMPLIFIER
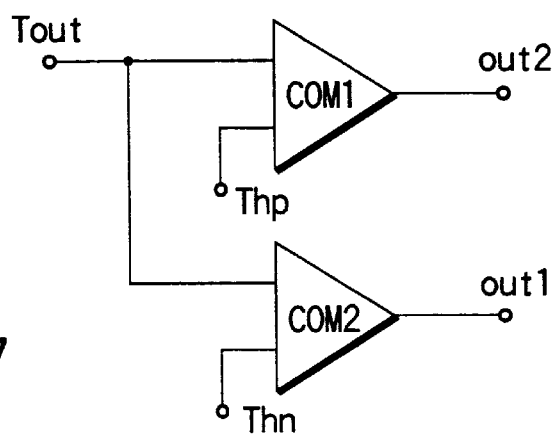
FIG. 17
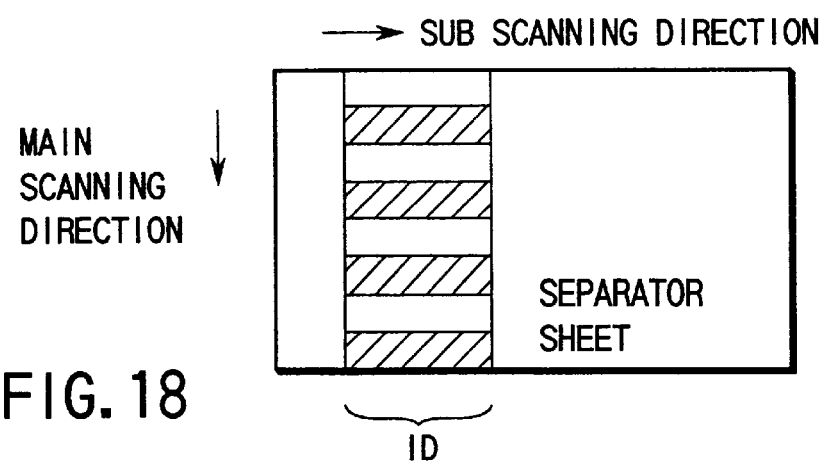
FIG. 18

| ID | PROCESS | PARAMETER |
|---|---|---|
| 1 | HIGH PASS γ GRADATION | H1, H2 --- NO DITHER(3 3) |
| 2 | LOW PASS γ GRADATION | L1, L2 --- γi1~γi256 ERROR DIFFUSION |
| ⋮ | ⋮ | ⋮ |

IMAGE FORMING APPARATUS FOR PROCESSING ACCORDING TO SEPARATION SHEET

BACKGROUND OF THE INVENTION

The present invention relates to an image forming apparatus such as a digital copier.

In the case different kinds of documents or data, which cannot be dealt with by the same inputting and outputting system or the same processing method are to be done as one job in a conventional image forming apparatus having a reading means (scanner) and an image forming means (printer) such as a digital copier, processing and copying are conducted according to each document, then the user finishes the job by inserting pages, and the like.

Further, in the case a special processing is required for a document with a special processing, all the documents are finished with the special processing unless the processing affects copy finishing of the other documents.

Recently, a method for instructing a copier or an image processing device automatically by means of an instruction sheet is proposed in Jpn. Pat. Appln. KOKAI Publication Nos. 5-112064, 5-289456, and 6-202415.

As mentioned above, a copying processing of documents including a document to be applied with a special image processing involves a problem in that extra time and labor are required since special documents and general documents are copied separately, and the user inserts the pages manually.

Moreover, in the case all processing is conducted by a special mode, it involves a problem in that the processing time becomes longer so that the copying rate declines, and further, the production cost will rise if expendable goods are used in the processing.

Furthermore, in the instruction method with an instruction sheet conventionally proposed, since a high technology is used for recognizing the instruction content on the sheet such as the OCR (optical character recognition), it involves a problem in that the recognition processing is complicated to take longer processing time and it requires the user's labor in making the instruction sheet.

BRIEF SUMMARY OF THE INVENTION

An object of the present invention is to provide an image forming apparatus capable of simplifying the instruction of a copying processing required by the user and the recognition processing of the instruction content to improve the user's convenience, and further, reducing the cost and accelerate the processing rate to improve the productivity.

An image forming apparatus according to the present invention comprises an image forming apparatus comprises means for receiving a processing instruction for image of documents in advance, means for reading the image of the documents including an separation sheet, means for recognizing the separation sheet from the documents, means for performing a process in accordance with the processing instruction, on the basis of a location in which the separation sheet is recognized, and means for forming an image based on the image of the documents which the process is performed.

According to the above-mentioned configuration, a separation sheet is read, and further, the document sheets and the separation sheets are distinguished to recognize the instruction content of the separation sheet. In view of both of the instruction content from an operation panel and the instruction content of the separation sheet, an instruction content is decided so that image processing of an image of a document will be conducted according to the decided instruction content. By separating the instruction content of the image processing to the separation sheet and the instruction from the operation panel as mentioned above, the instruction content of the separation sheet can be simplified. For example, the instruction content of the separation sheet can be one merely indicating the inserting position of a special document, or one indicating the number of pages to be inserted. Accordingly, since a time-taking processing is not applied to the separation sheet such as the conventional optical character recognition, an image forming apparatus capable of achieving the higher processing rate and the cost reduction can be provided.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a table showing an example of storage in a paper sheet detection judgment table provided in the detection means with size of FIG. 6;

FIG. 14 is a diagram showing a configuration of a color sensor, which is an example of a characterizing sensor of FIG. 6;

FIG. 15 is a diagram for explaining the color detection method in the RGB space of a recognition means with character of FIG. 6;

FIG. 16 is a diagram showing a configuration of a sensor of a transmissivity sheet, which is an example of a characterizing sensor;

FIG. 17 is a diagram showing a configuration of judging a separation sheet from the transmissivity of a recognition means with character of FIG. 6;

FIG. 18 is a diagram showing an example of an ID pattern to be printed on a separation sheet;

DETAILED DESCRIPTION OF THE INVENTION

Hereinafter embodiments of the present invention will be explained with reference to drawings.

(1) Configuration of an image forming apparatus

Figure 1:
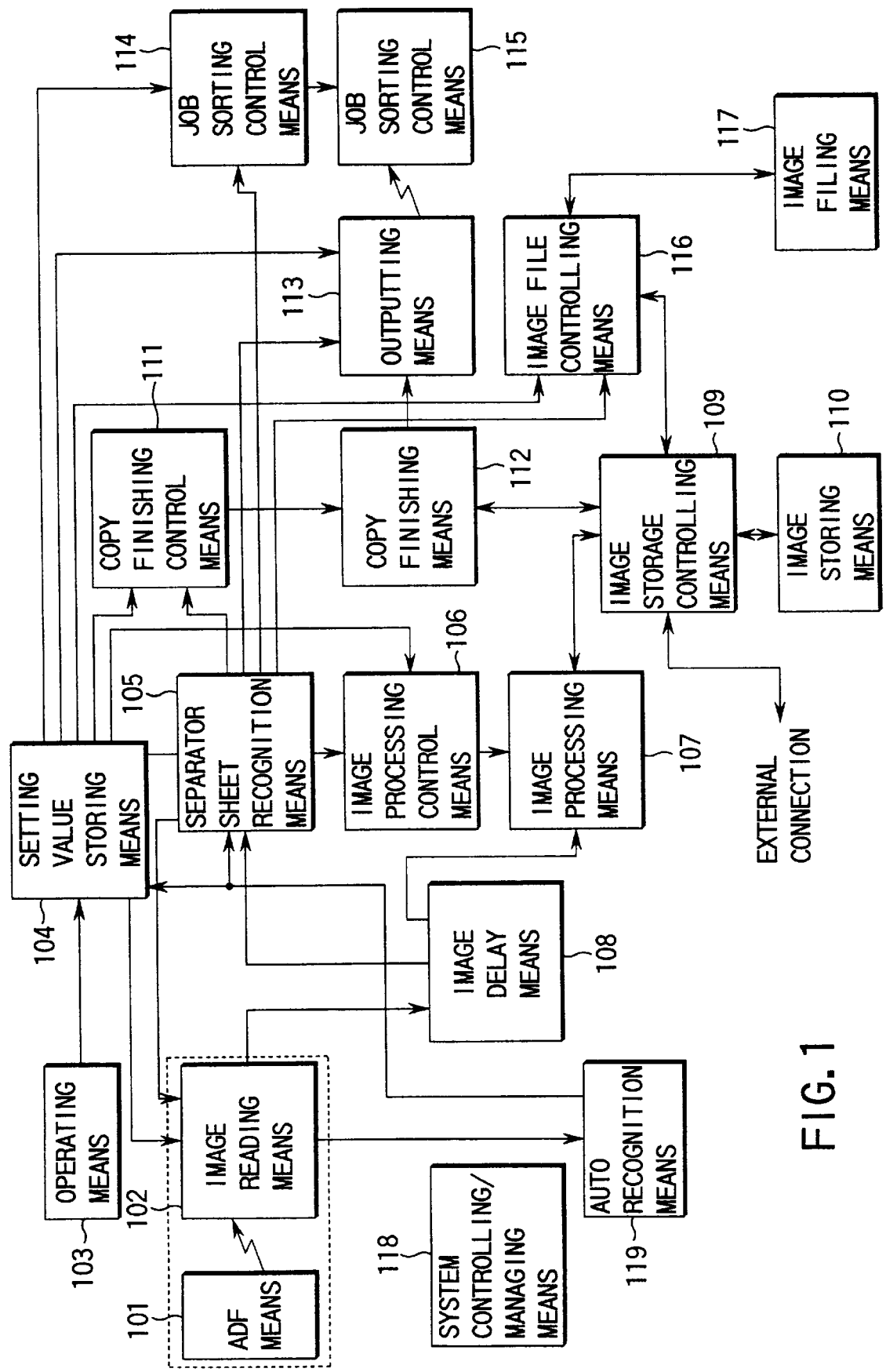
FIG. 1 is a chart schematically showing the main electric configuration of one embodiment of an image forming apparatus (copier) of the present invention.

FIG. 1 is a chart schematically showing the configuration of an image forming apparatus, specifically, an electrophotography type copier (hereinafter referred to simply as a copier) of this embodiment.

As shown in FIG. 1, the copier comprises an automatic document feeder (ADF) means 101, an image reading means 102, an operating means 103 for inputting various kinds of processing information to an image processing device by the user, a setting value storing means 104 for preliminarily storing various setting values for processing, input from the operating means 103, or recognition results of a separation sheet, a separation sheet recognition means 105 for recognizing a separation sheet, an image processing control means 106 for controlling the image processing according to the setting, an image processing means 107 for image-processing according to the instruction of the image processing control means 106, an image delay means 108 for temporarily storing an inputted image, an image storing means 110 for storing a processed image, an image storage controlling means 109 for exchanging external processing or a data supply means with the image storing means 110, a copy finishing means 112 for finishing a copy, a copy finishing control means 111 for controlling the copy finishing means 112, an outputting means 113 for outputting a processed image, a job sorting means 115 for sorting an outputted image per job, a job sorting control means 114 for controlling the job sorting means 115, an image filing means 117 for a simple filing of a document image, an image file controlling means 116 for controlling the image filing means 117, a system controlling/managing means 118 for controlling and managing the entire system, and an auto recognition means 119 for automatic recognition of a document and supplying the document information, such as the kind and the complexity to the corresponding processing block.

Then each block will be explained in detail.

(2) Automatic document feeder (ADF) means, image reading means

The AUTOMATIC DOCUMENT FEEDER means 101 is for sending a separation sheet for giving instruction to a subject document or an image processing device and the plurality of documents to a reading document by the image reading means 102. The image reading means 102 is for reading a document sent by the AUTOMATIC DOCUMENT FEEDER means 101 or a document directly placed on the document table with an optical system and a CCD sensor, transferring it photoelectrically, and supplying it as digital image data to the next block.

The configuration of the AUTOMATIC DOCUMENT FEEDER means 101 and the image reading means 102 will be explained in further detail.

Figure 2:
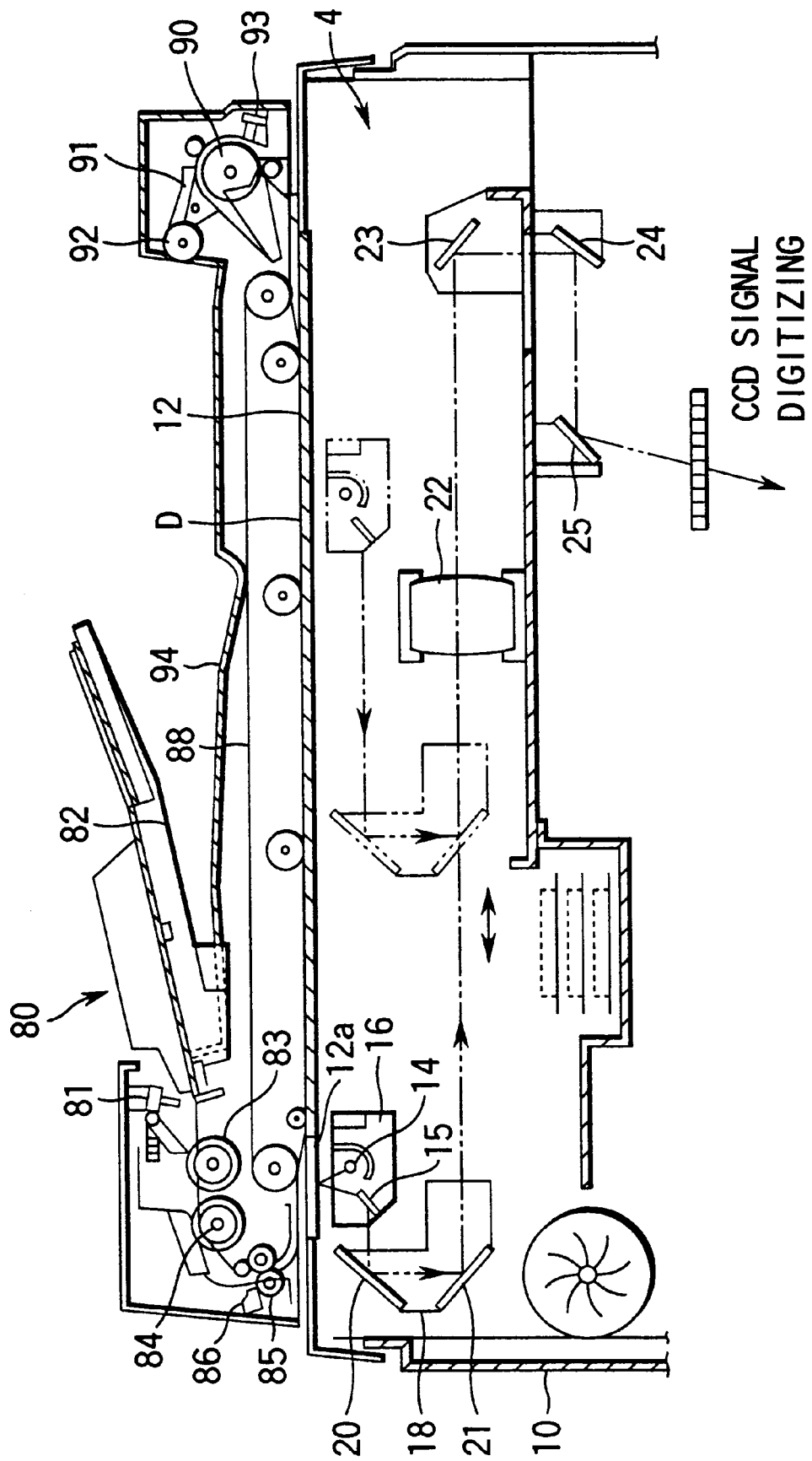
FIG. 2 is a diagram for explaining the mechanical configuration of the embodiment of the image forming apparatus mainly showing an ADF means and an image reading means.
Figure 3:
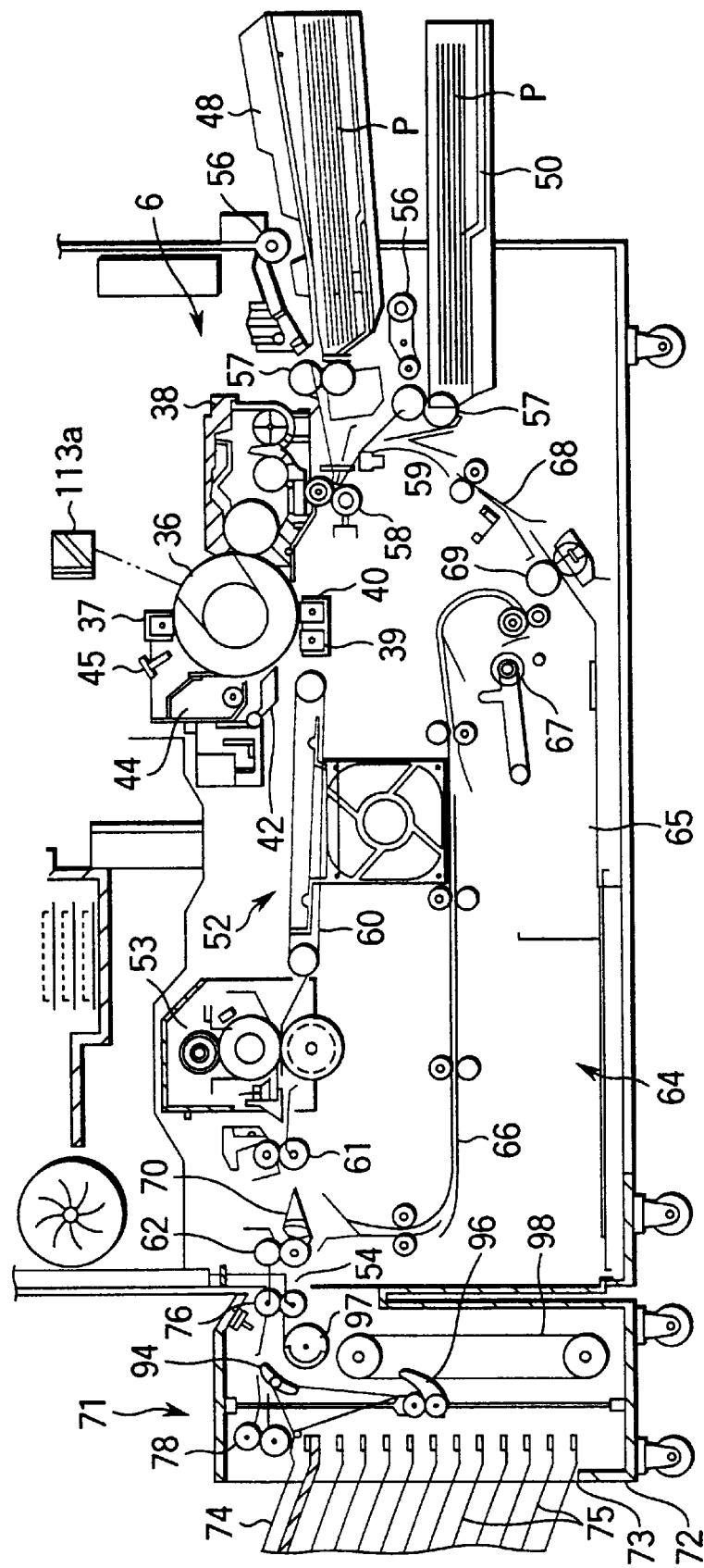
FIG. 3 is a diagram for explaining the mechanical configuration of the embodiment of the image forming apparatus mainly showing an ADF means, an image reading means, an outputting means, and a job sorting means.

As shown in FIG. 2 and FIG. 3, the copier comprises an apparatus main body 10, provided mainly with the ADF means 101 and an image reading portion 4 to serve as the image reading means 102.

The image reading portion 4 comprises a document placing table 12 made of transparent glass for placing a subject to be read, that is, a document D, and a size plate 12*a* provided at one end of the document placing table 12 for indicating the position to place the document D.

An automatic document feeder 80 (hereinafter referred to as ADF) is provided on the upper surface of the apparatus main body 10. The ADF feeds documents onto the document placing table 12 automatically as well as serves as a document presser for pressing the document D on the document placing table closely to the document placing table since it can be open or close with respect to the document placing table.

The ADF comprises a document tray 82 for placing a document D, an empty sensor 81 for detecting whether or not a document is present, a pick-up roller 83 for picking up a document one by one from the document tray 82, a paper feeding roller 84 for conveying a picked-up document, a pair of aligning rollers 85 for aligning the edge of a document, and an aligning sensor 86 provided upstream of the pair of the aligning rollers for detecting the arrival of a document.

The ADF 80 also comprises a conveyance belt 88 provided substantially covering the entirety of the document placing table 12 so that a document D fed to the document placing table 12 from the size plate 12*a* side by the paper feeding roller 84 and the pair of the aligning rollers 85 is sent to a predetermined position on the document placing table by the conveyance belt 88.

A reversing roller 90, a non-reversing sensor 93, a flapper 91, and a paper discharging roller 92 are provided on the opposite end of the pair of the aligning rollers 85 with respect to the conveyance belt 88 in the ADF. After reading the image information of a document by the document reading portion 4 of the apparatus main body 10, the document D is fed out from the document placing table 12 by the conveyance belt 88 so as to be discharged to a document discharging portion 94 on the upper surface of the ADF 80 via the reversing roller 90, the flapper 91, and the paper discharging roller 92.

In the case the reverse side of the document D is to be read, the document conveyed by the conveyance belt 88 is reversed by the reversing roller 90 by switching the flapper 91 and again it is sent to the predetermined position on the document placing table 12 by the conveyance belt 88.

The ADF 80 comprises a paper feeding motor 95 for driving the pick-up roller 83, the paper feeding roller 84, and the pair of the aligning rollers 85, and a conveyance motor 96 for driving the conveyance belt 88, the reversing roller 90 and the paper discharging roller 92.

The image reading portion 4 provided inside the apparatus main body 10 has an illuminating lamp 14 for illuminating a document D placed on the document placing table 12 and a first mirror 15 for deflecting a light beam reflected from the document D to a predetermined direction. The illuminating lamp and the first mirror are attached to a first carriage 16 provided below the document placing table 12 in the apparatus main body 10.

The first carriage 16 is provided movable parallel to the document placing table 12 by a pulse motor (not illustrated) via a toothed belt (not illustrated). A second carriage 18 movable parallel to the document placing table 12 is provided below the document placing table 12.

Second and third mirrors 20, 21 arranged perpendicularly are provided in the second carriage 18 for successively deflecting the light beam reflected by the document D and deflected by the first mirror 15. The second carriage 18 is moved parallel along the document placing table 12 at the half rate with respect to the first carriage according to the movement of the first carriage 16 by the toothed belt and the like for driving the first carriage 16.

An image forming lens 22 for gathering the reflected right beam from the third mirror 21 on the second carriage 18 and fixed fourth to sixth mirrors 23, 24, 25 for introducing the reflected light beam gathered by the image forming lens backward to a photosensitive drum later described are provided below the document placing table 12. The image forming lens 22 is provided movable in the plane including the optical axis of the light beam deflected by the third mirror 21 via a driving mechanism so that the light beam can form an image at a desired magnification by the self-movement.

The reading operation of a plurality of documents in the image reading portion 4 having the above-mentioned configuration will be explained.

A first document on the document tray 82 is fed to a predetermined position on the document placing table 12 of the apparatus main body 10 by the ADF 80. A copying paper P is taken out from one of the paper cassettes 48 (or 50) to be conveyed by the paper feeding roller 57 toward a pair of resist rollers 58 until a pre-resist sensor 59 is switched on. When the pre-resist sensor 59 is switched on, the paper feeding operation is temporarily stopped.

Then the ADF controlling portion judges whether of not a document is jammed by the aligning sensor 86, the reversing sensor 93, and the like in the ADF 80. In the case no document D is jammed, image information is read from the document on the document placing table 12 by the image reading portion 4 under the control of the main controlling portion so as to conduct the photoelectric transfer by the CCD sensor according to the read image information.

(3) Operating means

The operating means 103 comprises indicating devices such as a touch panel LCD on the control panel.

Figure 4:
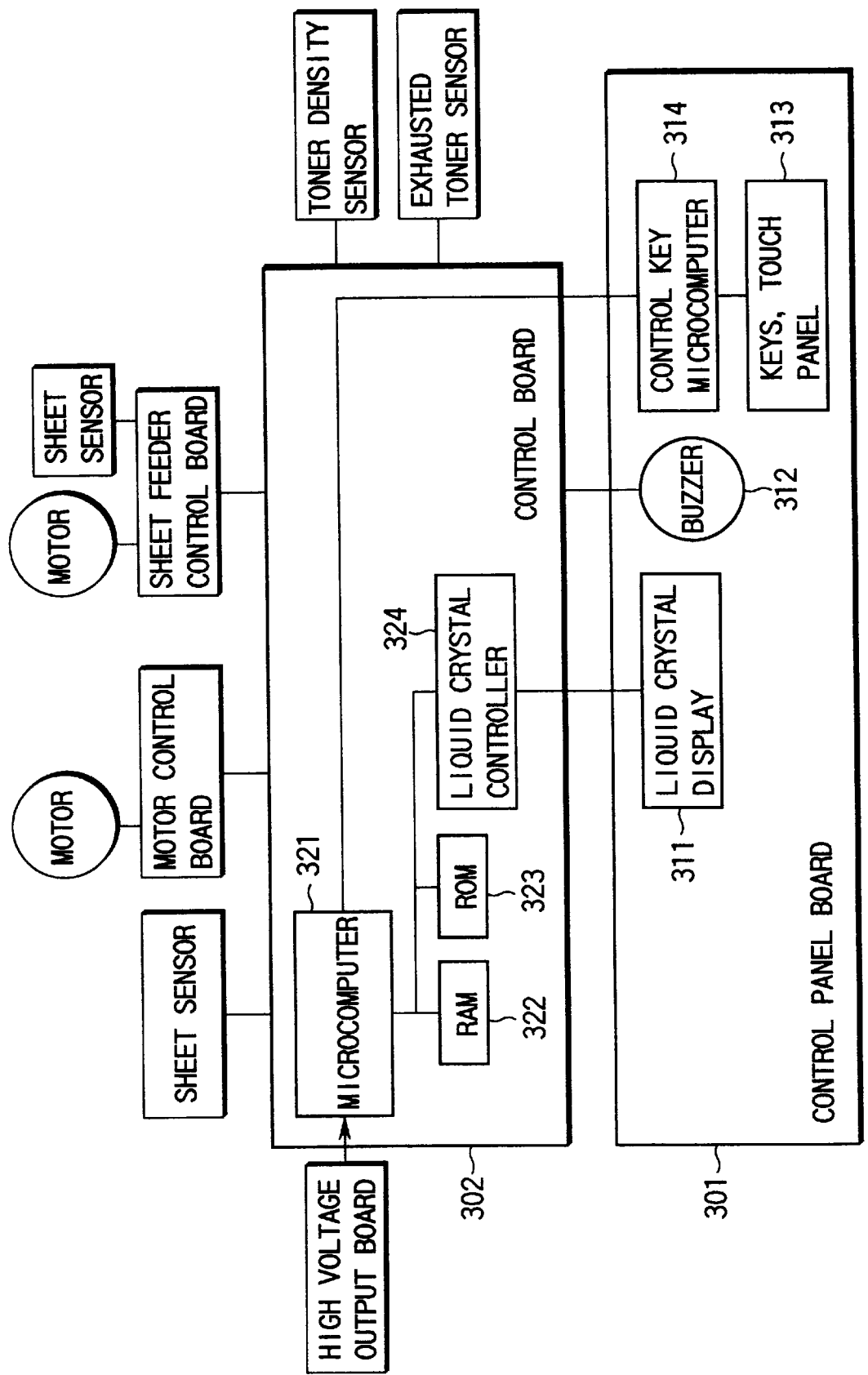
FIG. 4 is a chart schematically showing a configuration of an operating means.

The configuration is shown in FIG. 4.

The depression state of keys on the control panel 301 and the touch panel is recognized by a control key microcomputer 314. The control key microcomputer 314 communicates the depression state to a microcomputer 321 of a control board 302. The microcomputer 321 data-accesses with a ROM 323 and a RAM 322 based on this information and outputs from the other sensors such as a paper sensor and a toner concentration sensor. A liquid crystal controller 324 communicates the data. Data of an indicated screen, program data, and the like are stored in the ROM 323, and an screen switching time, and the like are stored in the RAM 322.

Further, parameter for internal processing, processing switching information, and the like are supplied to a setting value storing means 104 through the microcomputer 321.

At the same time, according to the situation, outputs such as driving of a motor are conducted to detect the jam processing, the toner supply processing, and the like from signals of processing setting error, the paper sensor, the waste toner sensor, the toner concentration sensor, and the like so that a buzzer on the control panel is sounded as needed.

The liquid crystal controller 324 transfers signals based on signals from the microcomputer 321 to a liquid crystal display device 311 so as to achieve a liquid crystal display.

(4) Setting value storing means

Figure 5:
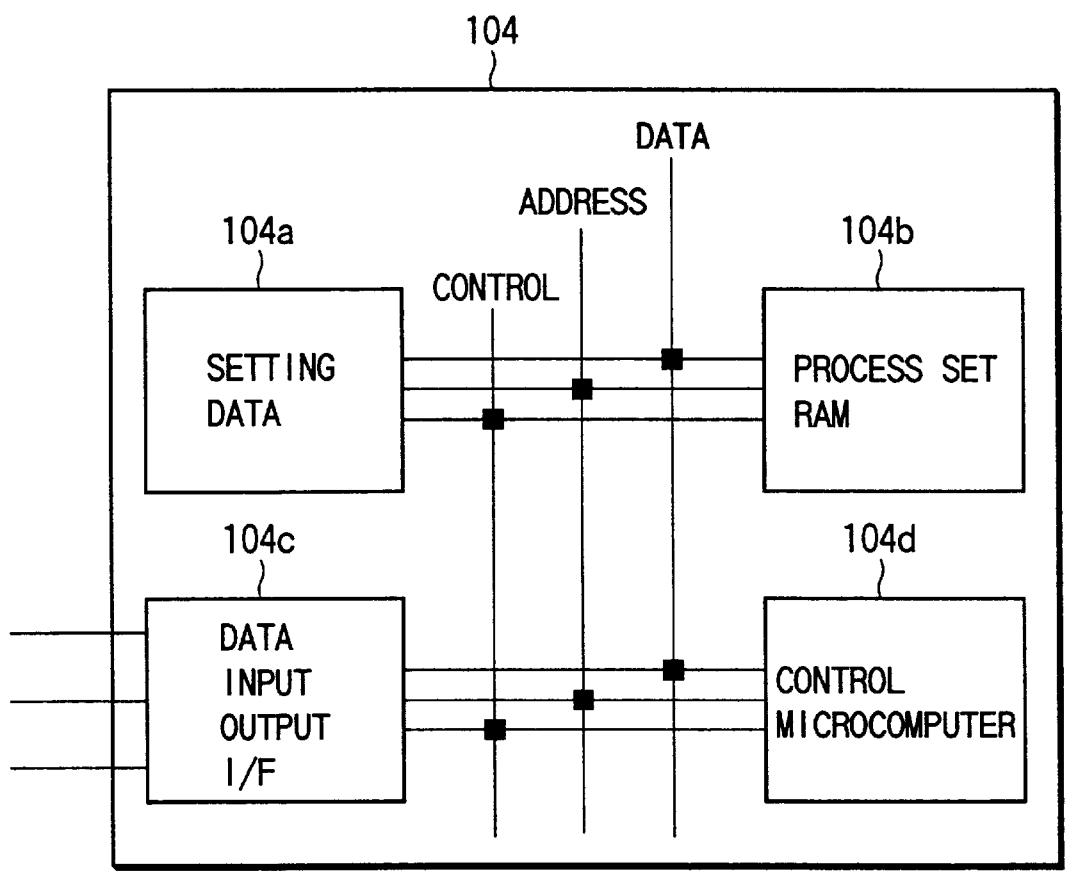
FIG. 5 is a chart schematically showing an embodiment of a setting value storing means.

The setting value storing means 104 will be explained with reference to FIG. 5.

The setting value storing means 104 comprises a setting data bank ROM 104a, a process set value ROM 104b, a control microcomputer 104d, and a data input output I/F 104c.

Setting values necessary for various kinds of processing are arranged in some manner and stored in the setting data bank ROM 104a. Matching is preliminarily determined, for example, setting for the character dedicated processing is from the "aaa" address to the "abc" address so that the corresponding data in the ROM 104a are downloaded to the process set RAM 104b by the microcomputer control to become the present setting, then the parameter of the corresponding processing block is set by the data input output I/F 104c.

The data input output I/F 104c is an interface for the exchange between the separation sheet recognition means 105 and the other blocks for reading or writing of set values in each block.

For setting data transferred from the setting of the operating means 103 or from the temporary setting by the separation sheet are received by outputting interrupt signals from the blocks, with the control microcomputer 104d in the input waiting state, then outputting a control signal from the microcomputer, and receiving information from the corresponding blocks through a data bus.

The control microcomputer 104 exchanges with external means through the data input output I/F 104c so that corresponding parameter from the setting data bank ROM 104a is downloaded to the process set RAM (buffer) 104b, or a preliminarily instructed calculation is conducted and the result is supplied to the process set RAM (buffer) as needed. Each means is set with only necessary data through the data input output I/F 104c.

Further, as mentioned above, set values are switched or revised according to the information inputted by the operating means 104 or the separation sheet recognition means 105. Moreover, according to the need, process set information per document or per job, or an ID corresponding to the ID registration to the process groups, which is the user customize function later described, is supplied to the outputting means 113 as bit map data, and the outputting means 113 outputs it.

(5) Separation sheet recognition means

Figure 6:
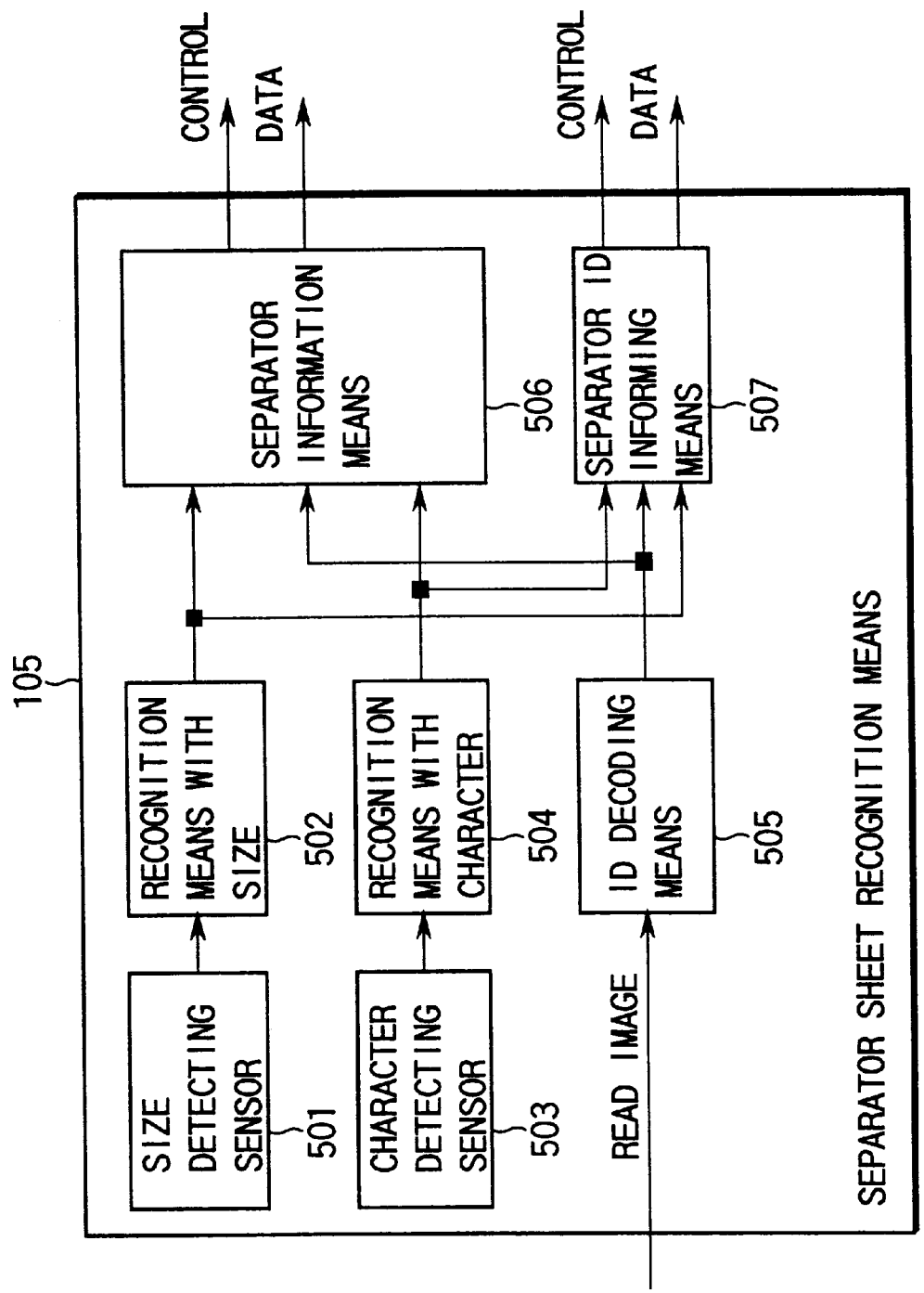
FIG. 6 is chart schematically showing a configuration of a separation sheet recognition means.

FIG. 6 shows a configuration of the separation sheet recognition means 105.

As shown in FIG. 6, the separation sheet recognition means 105 comprises a size detecting sensor means 501, a recognition means with size 502, a characterizing sensor means 503 for detecting characteristics of a paper, such as a color and the transmissivity, a recognition means with character 504, an ID decoding means 505 for reading the ID pattern on the separation sheet, and the like from the inputted image, a separation informing means 506 for recognizing the separation sheet from the result so as to send the information to a corresponding block, and a separation ID informing means 507 for informing the ID of the separation sheet.

Figure 7:
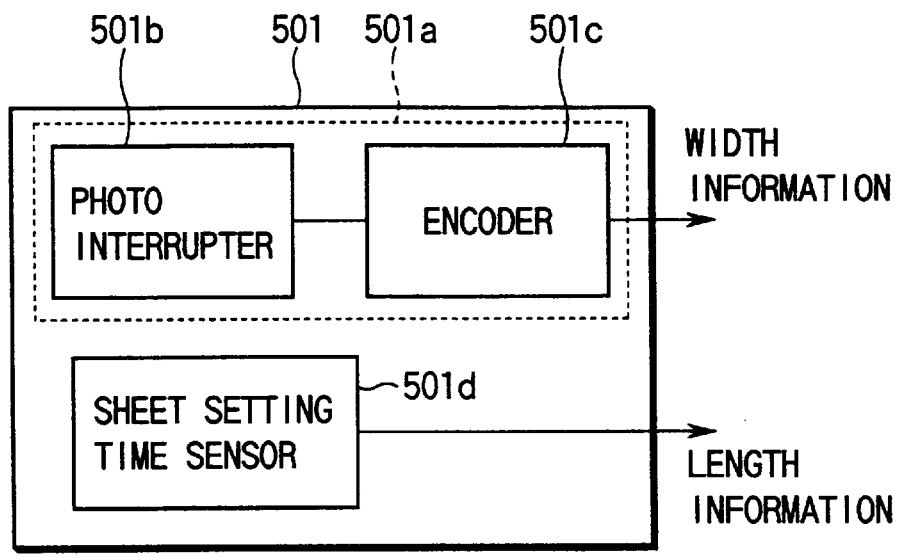
FIG. 7 is a chart showing a configuration of a size sensor of FIG. 6.

As shown in FIG. 7, the size detecting sensor means 501 comprises a sheet width sensor 501a and a sheet setting time sensor 501d for outputting the sheet width information and the sheet length information, respectively.

The sheet width sensor 501a comprises a photo interrupter 501b and an encoder 501c later described.

Figure 8:
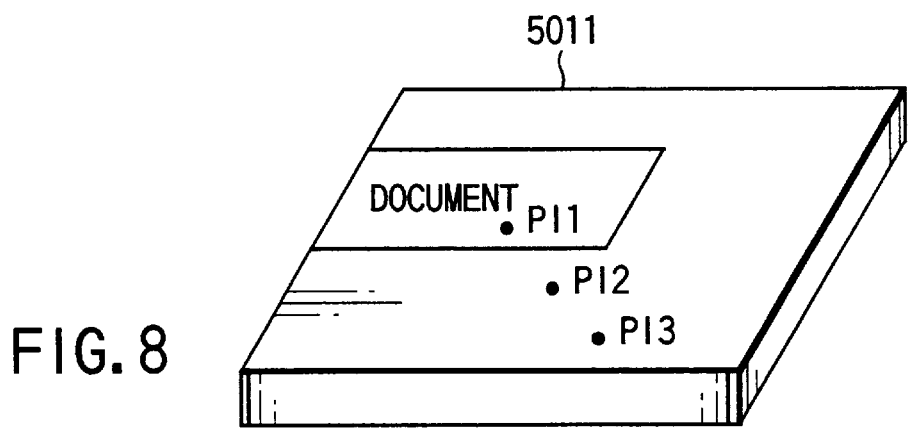
FIG. 8 is a diagram showing an embodiment of a width sensor.

As shown in FIG. 8, the photo interrupter 501b includes a document table 5011 and a reflection type photo interrupter comprising infrared-emitting diodes (LED) PI1 to PI3 and a photo transistor. Since a light beam of the LED is reflected by the document when a document is placed on the document glass, the photo transistor can be on or off according to the existence of the reflected light so as to allow the detection of the existence of the document.

Figure 9:
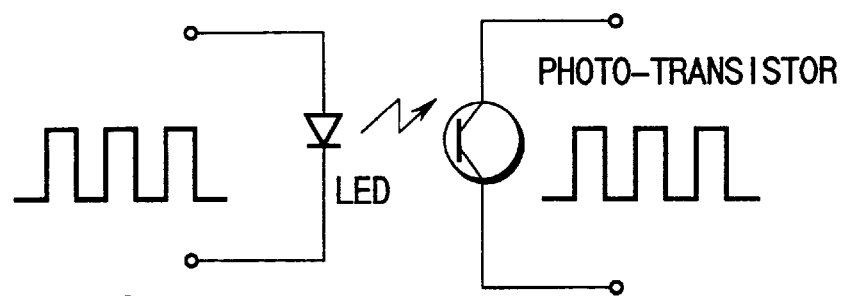
FIG. 9 is a diagram showing a configuration of a photo interrupter of FIG. 7.

For example, as shown in FIG. 9, with a rectangular electric wave applied to the LED for having the LED emit at a certain frequency for checking the reaction of the photo transistor, the output shown in FIG. 9 can be obtained from the photo transistor in the case a document is present, and the output "0" can be obtained in the case a document is not present.

Figure 10:
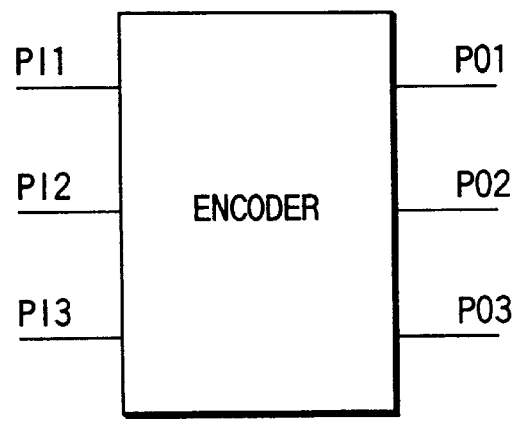
FIG. 10 is a diagram showing a configuration of an encoder of FIG. 7.

As shown in FIG. 10, according to the on/off state of the sensors PI1, PI2, PI3, the encoder 501c puts the corresponding outputs PO1 to PO3 at the high (H=1) or low (L=1) state. For example, if the photo transistor responds to the PI1 photo interrupter as in FIG. 9 by a reflected light beam, the corresponding output PO1 becomes H(1), otherwise, it becomes L(0). Similarly, the PO2 becomes H(1) or L(0) according to the response of the sensor PI2, and the PO3 becomes H(1) or L(0) according to the response of the PI3. They are supplied to the recognition means with size 502 of FIG. 6 as the sheet width information.

The sheet setting time sensor 501d measures the time necessary for setting a sheet by the ADF and supplies it to the recognition means with size 502 of FIG. 6 as the length information. For example, with the sheet setting time by the ADF of T sec and the sheet setting speed of S mm/sec, an approximate sheet length can be assumed since the sheet length is proportional to S×T.

Figure 11:
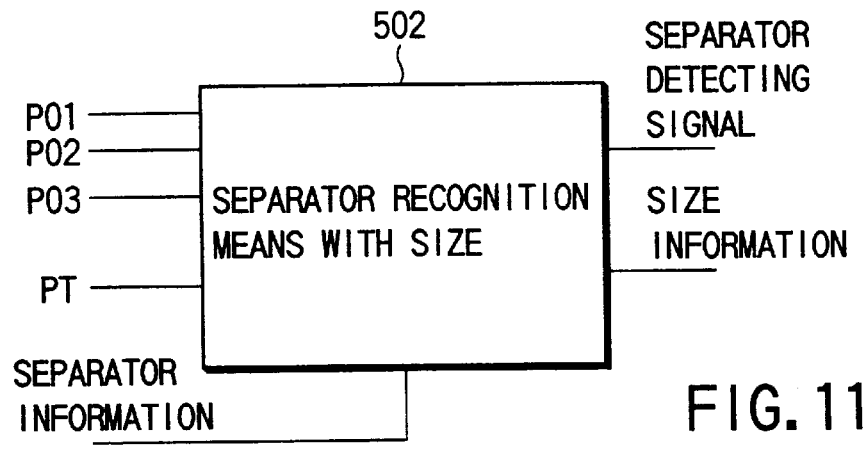
FIG. 11 is a diagram showing a configuration of a recognition means with size of FIG. 6.

As shown in FIG. 11, the recognition means with size 501 receives the information on the sheet width and length from the size detecting sensor means 501, and compares it with a preliminarily set information. In the case it is the same as the size of the separation, a separation detecting signal (separation=1, others=0) and the corresponding size (for example, the corresponding input as it is) are outputted.

Figure 12:
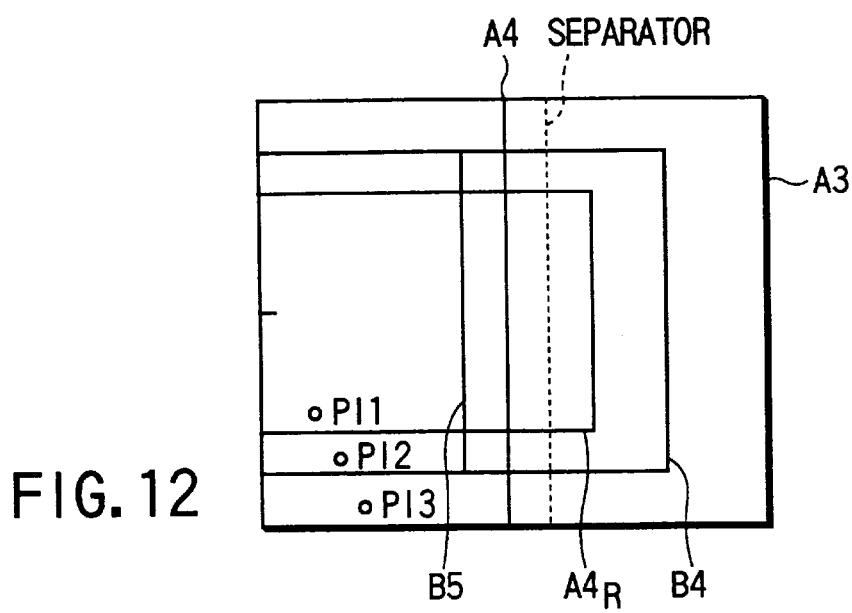
FIG. 12 is a diagram for explaining the sheet size detection.

A concrete example of the case of detecting a separation sheet based on the size is shown in FIG. 12 and FIG. 13.

Although an example with only one separation sheet defined by a combination of width information and length information is given in this embodiment to facilitate understanding, it is also possible to define by a combination of a plurality of separation sheets. Further, it is also possible to define things other than the size of a document to be copied, such as having an A3 size separation sheet for an A4 document.

Then, the characterizing sensor 503 and the recognition means with character 504 of FIG. 6 will be explained. The character herein denotes the characteristics of the paper of the separation sheet, such as color, transmissivity, and the like.

First, the case of recognizing the separation sheet by color detection will be explained. In this case, the characterizing sensor 503 is a sensor for detecting the base color of the paper, and the recognition means with character 504 is for recognizing whether or not the detected base is the separation.

The base color sensor of the separation sheet 503 comprises a carriage of the scanner 5042 provided with color sensors 5043 to 5045 at one or a plurality of parts thereon as shown in FIG. 14. When the carriage moves, the RGB characteristics of a several lines of reflected light beams at the tip of a separation sheet 5046 placed on a document table 5041 are read so that the average thereof is supplied to the recognition means with character 504 as the base color information.

For example, as shown in FIG. 14, color sensors 5043 to 5045 are provided in the vicinity of the center and both ends of the separation sheet with respect to the separation sheet 5046 so that R, G, B are read at initial several lines (such as 50) when the carriage 5042 moves to the reading operation from reflected light beams of positions corresponding to each line, and the average is outputted as the base color of the sheet.

The recognition means with character 504 is for judging whether or not the detected base is the separation or not. As shown in FIG. 15, the average RGB information from the color detecting sensor 503 and the preliminarily set RGB components of a separation are compared so as to make judgment on whether or not it is a separation sheet based on whether or not it is within the preliminarily determined error range.

That is, with the premise that a vector S represents a separation sheet and a vector M represents a measured average color characteristic in the RGB space, if the R, G, B components of the difference vector D of the vector S and the vector M, DR, DG, DB are:

$|DR| < \epsilon R$, wherein $\epsilon R$ is the error range of the R component, $|DG| < \epsilon G$, wherein $\epsilon G$ is the error range of the G component, and $|DB| < \epsilon B$, wherein $\epsilon B$ is the error range of the B component, it is recognized to be the separation sheet.

If the error range for R, G, B can be set independently by the separation sheet, different ranges can be set independently for positive and negative components.

If it is a separation, the recognition means with character 504 outputs the separation detecting signal (separation=1, others=0), and the corresponding color information (for example, the corresponding measured average RGB as it is, or the RGB of the corresponding separation sheet, and the like).

Although only the case of a separation sheet of a certain size has been discussed herein, for example, it is also possible to recognize a separation sheet according to the need of the user with a movable sensor so that the position can be set by the user, with the number of the color sensors on the carriage 5042 increased so as to correspond to separation sheets of various widths for recognizing the separation from the width and sensor information.

Then another example of the characterizing sensor 503 and the recognition means with character 504 of FIG. 6 will be explained. For example, the case with a paper or a medium with a high transmissivity used as the separation sheet, and the separation sheet is detected based on the transmissivity of the subject to be detected is described. In this case, the area appointment in the document can be conducted.

As shown in FIG. 16, the transmissivity detecting sensor of a separation sheet 503 can detect the existence of a paper and a separation sheet by the amount of a reflected light beam by a sensor of the transmissivity like the above-mentioned size detecting sensor.

The sensor of FIG. 16 differs from the sensor of FIG. 9 in that the photo transistor amplifies a reflected light beam so that the reflected light beam is supplied to the subsequent recognition means with character 504 as it is.

The recognition means with character 504 has a configuration shown in FIG. 17. Several thresholds (in this case, two thresholds Thn, Thp, Thn<Thp) and the output of the transmissivity detecting sensor 503 are compared by comparators COM1, COM2 so as to make judgment on whether or not it is a separation sheet form the comparison result.

In the case there is little reflected light beam, it is the case of "no document" so that both outputs from the comparator COM2 for comparing with the Thn and the comparator COM1 for comparing with the Thp shown in FIG. 17 become "0".

In the case there is a certain amount of reflected light beam (Thn<input<Thp), the output from the comparator COM2, according to the change of the input, becomes "0" when the input is smaller than Thn, and when the input is larger than Thn, becomes "1". In this case, the output of the comparator COM1 becomes "0" to be judged as a separation sheet.

Since the outputs from both COM1, COM2 become large when the reflected light beam is large, that is, larger than Thn and Thp, it is judged to be a document.

Accordingly, if a medium with a high transmissivity can be recognized as a separation sheet, means for detecting a colored separation sheet with a high transmissivity can be considered by combining with the above-mentioned color detecting sensor.

Further, it can also be considered to designate processing or editing depending on the area in the document by placing one with a high transmissivity on the document and marking an area of the document by a marker for appointing a certain area.

The processing instruction corresponding to the area can be the instruction by the above-mentioned operating means 103 or an ID designating instruction later described. Furthermore, instruction by a color marker can also be considered in the case the reading CCD is a color sensor.

An ID decoding means 505 in FIG. 6 is for reading the ID outputted from the device later described. As shown in FIG. 18, the ID pattern is a cyclic pattern in the main scanning direction.

The ID decoding means 505 decodes the number of the patterns, for example, in the case of a black and white pattern, the number of black and white and the width thereof are decoded from the starting line to a predetermined distance in the sub scanning direction for each line. If they are substantially the same in each line and form a cyclic pattern of the same width preliminarily set in the main scanning direction, the ID is recognized by the number thereof. For example, in the case of FIG. 18, the processing ID is "4".

The separation informing means 506 of FIG. 6 recognizes the meaning of the separation by referring to a recognition table preliminarily stored inside thereof in view of the judgment result by the recognition means with size 502, the recognition means with character 504, and the ID decoding means 505 so as to give instruction to the corresponding external block. For example, if it is a separation sheet for a page insertion, instruction of the insertion or inserting position is given to a copy finishing means 111 later described, or if it is for switching the image processing, the information is conveyed to an image processing control means 106 or the above-mentioned setting value storing means 104.

Accordingly, the information is conveyed to a corresponding processing means of a subsequent stage according to the separation sheet.

Since the separation ID informing means 507 conveys the information directly to the setting value storing means 104 when a processing ID is detected, the setting value storing means 104 conducts the corresponding setting.

(6) Image processing control means

Figure 19:
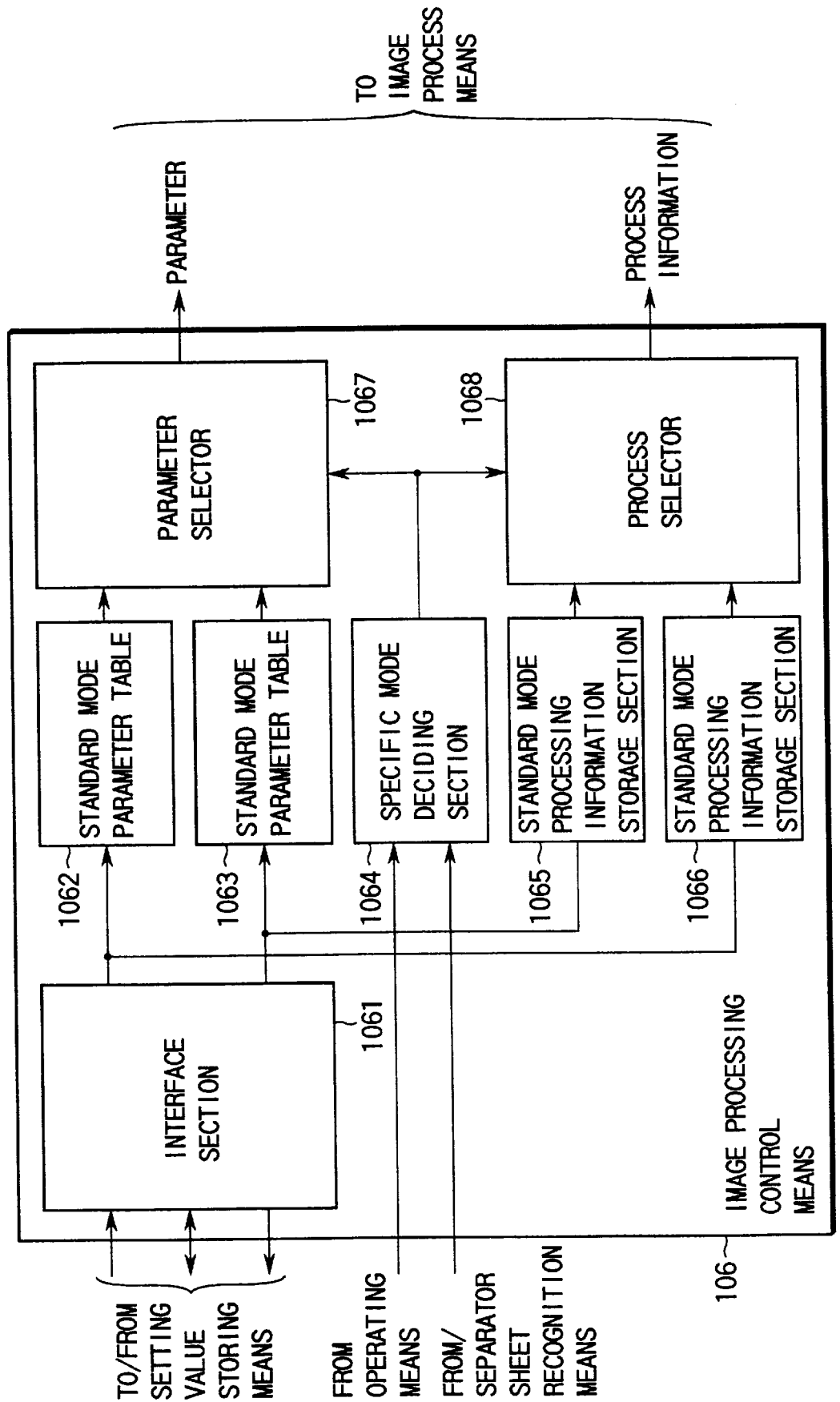
FIG. 19 is a chart showing a configuration of an image processing control means.

The image processing control means of FIG. 1 is for switching the route or parameter of the image processing according to a specific document. As shown in FIG. 19, it comprises an interface (I/F) section 1061 with the setting value storing means 104 (see FIG. 1), a standard mode parameter table 1062, a specific mode parameter table 1063, a specific mode deciding section 1064, a standard mode processing information storage section 1065, a specific mode processing information storage section 1066, a parameter selector 1067, and a process selector 1068. Usually, it supplies the parameter or processing information corresponding to the standard mode to the image processing means 107.

The parameter or processing information in the standard mode or the specific mode is downloaded from the setting value storing means 104 to the standard mode parameter table 1062, the specific mode parameter table 1063, the standard mode processing information storage section 1065, and the specific mode processing information storage section 1066 via the interface means 1061.

In the case the information on the specific mode is known beforehand (such as the case of setting via the operating means 103), it can be downloaded as mentioned above. However, in the case it is instructed by a separation sheet, it is downloaded according to the recognition result by the separation sheet recognition means 105 for each time.

The specific mode deciding means 1064 is for deciding whether or not it is a specific processing based on the information from the operating means 103 or the separation sheet recognition means 105. In the case of a specific processing, necessary parameter, processing information and the like are written in the specific mode parameter table 1063, and the specific mode processing information storage section 1066 from the setting value storing means 104 via the interface section 1061, then the parameter selector 1067 and the processing selector 1068 select the parameter and the processing information for the specific processing and supply them to the image processing means 107 (see FIG. 1).

After finishing the specific processing, the specific mode deciding means 1064 outputs a signal capable of selecting parameter or processing information corresponding to the standard mode to the parameter selector 1067 and the processing selector 1068.

(7) Image processing means

Figure 20:
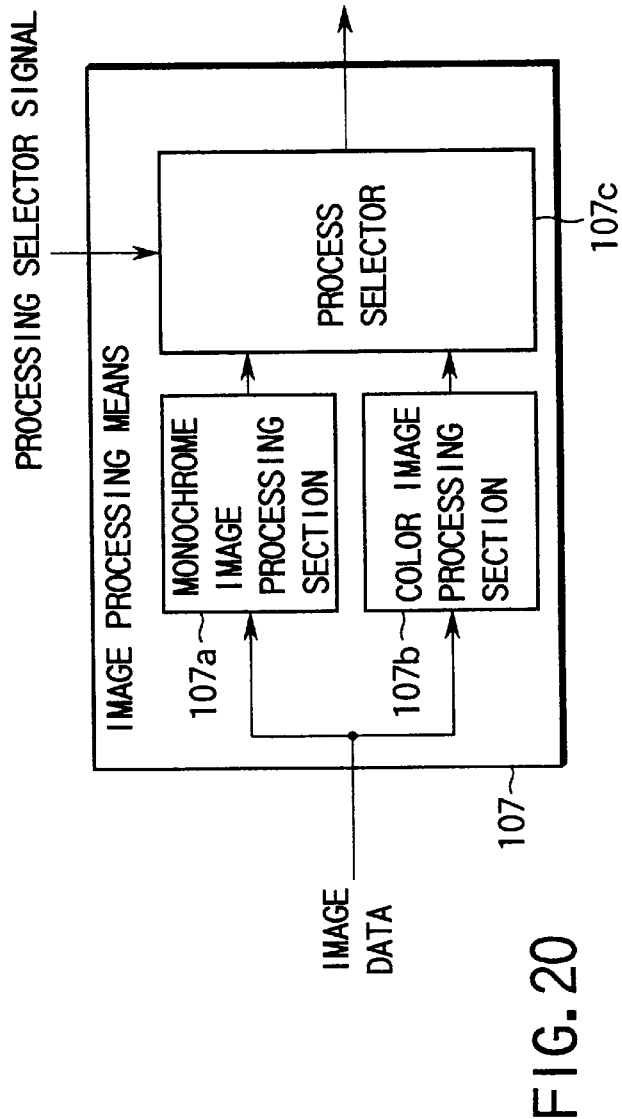
FIG. 20 is a chart showing a configuration of an image processing control means.

As shown in FIG. 20, the image processing means of FIG. 1 comprises a monochrome image processing section 107a, a color image processing section 107b, and a process selector 107c, where the processing selector 107c can switch to either of the monochrome image processing section 107a and the color image processing section 107b. For example, in the case only one of a plurality of documents is to be color-processes, it switches such that the color processing is applied only for the document, and the monochrome processing is applied to the other documents.

Figure 21:
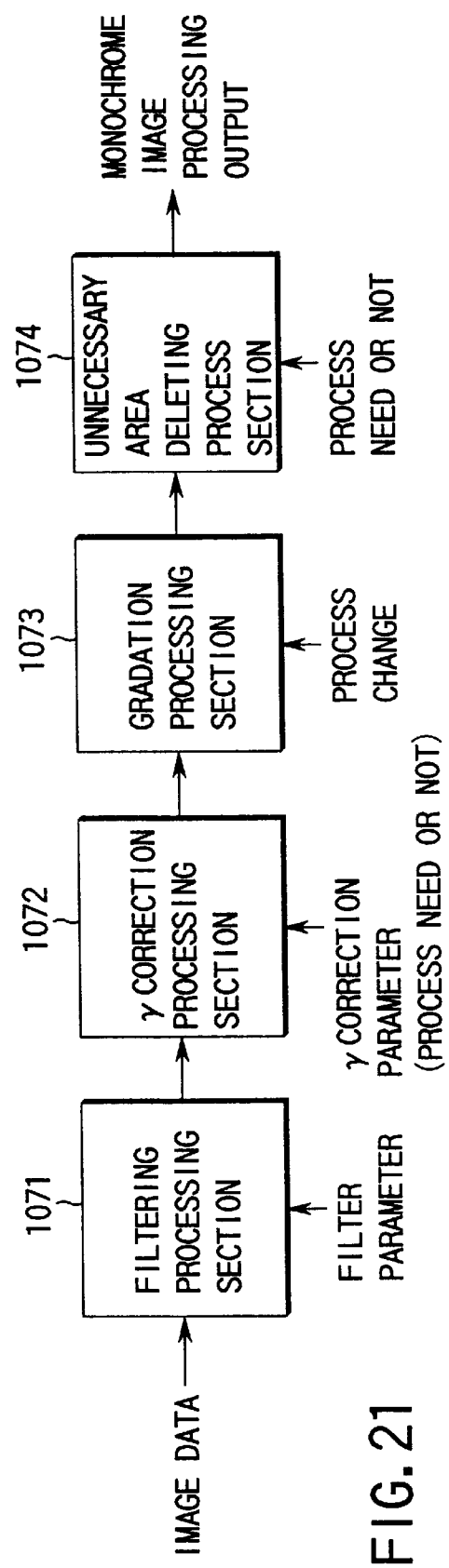
FIG. 21 is a chart showing a configuration of a monochrome image processing section of FIG. 20.

A configuration of the monochrome image processing section 107a is shown in FIG. 21.

The monochrome image processing section 107a of FIG. 21 comprises a filtering processing section 1071 for applying the noise elimination or the edge emphasis to an image read by the image reading means 102, a γ correction processing section 1072 for correcting the nonlinear characteristics of the input output system, a gradation processing section 1073 for reproducing the gradation according to the gradation number of the output system, and an unnecessary area deleting process section 1074 for eliminating portions, such as the outside part of a document, or the thickness of a book, and the like.

Figure 22:
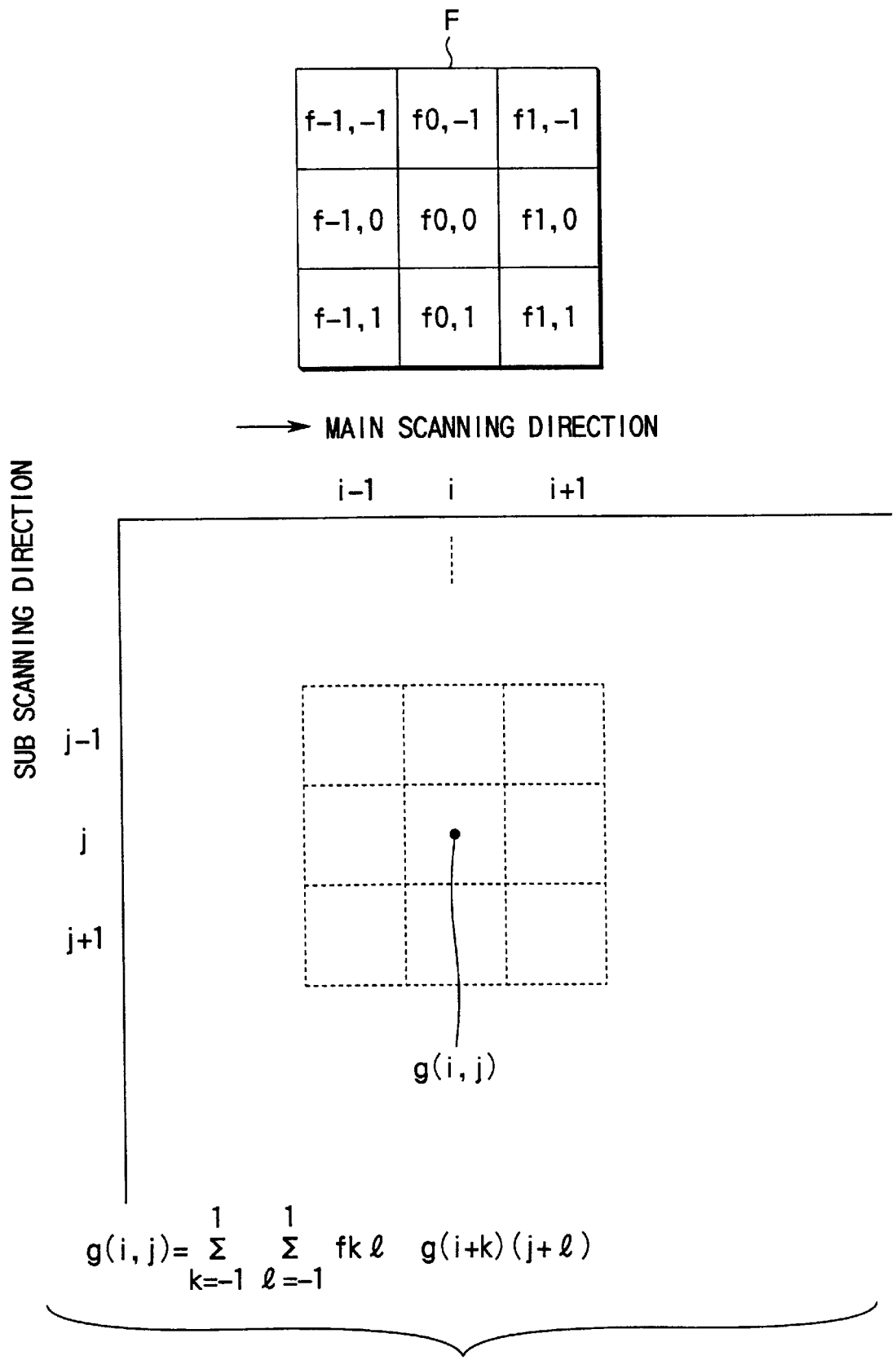
FIG. 22 is a diagram for explaining an example of processing in a filtering processing section of FIG. 21.

An example of a filtering processing in the filtering processing section 1071 is shown in FIG. 22.

In the case a filter F of a 3×3 size is applied to a picture element g (i, j), the filtering processing result of the picture element g (i, j) can be expressed by the convolution of a filter coefficient and an image, which can be represented by the below-mentioned formula (1):

$$g'(i, j) = \sum_{k=-1}^{1} \sum_{l=-1}^{1} f_{k,l} \cdot g(i+k)(j+l) \quad (1)$$

Which frequency component is to be emphasized, or to be eliminated can be decided according to the filter coefficient. For example, it can be considered that a high pass filter is emphasized in the case of a character document, or a low pass filter is emphasized in the case of a photograph document. Accordingly, by changing parameter according to the document, an appropriate output can be obtained.

Figure 23:
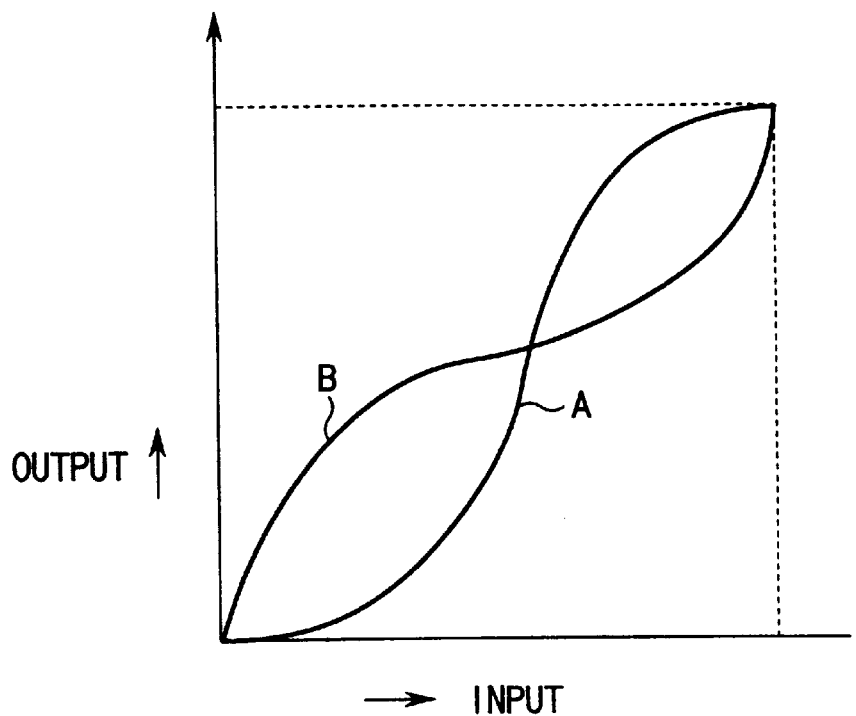
FIG. 23 is a diagram showing an example of processing in a γ correction processing section of FIG. 21.
Figure 24:
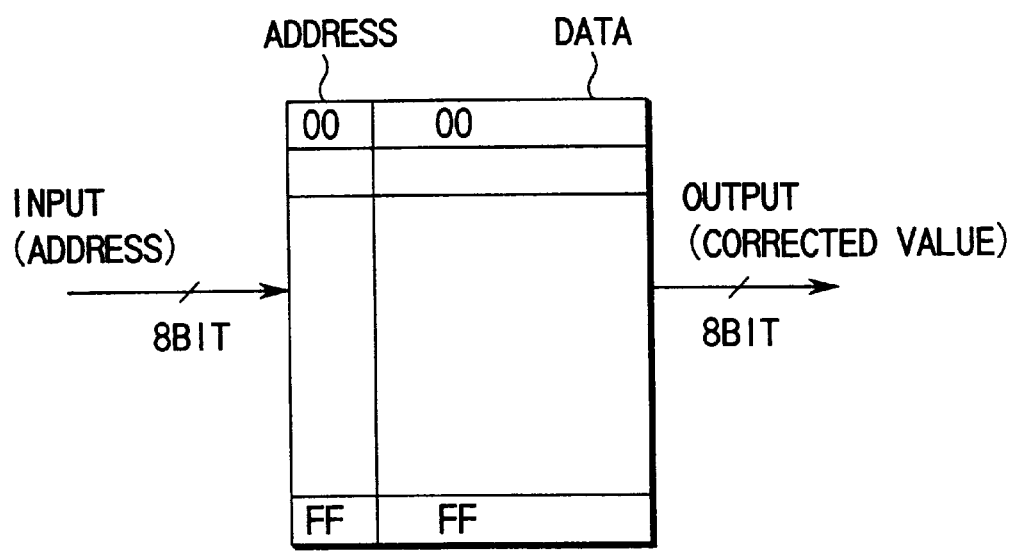
FIG. 24 is a diagram showing a configuration of a γ correction processing section of FIG. 21.

An example of the γ correction processing in the γ correction processing section 1072 will be explained with reference to FIG. 23 and FIG. 24.

The γ correction is to correct the nonlinear characteristics of input and output. A value corresponding to the reverse curve B of a nonlinear input output characteristic curve A of the input and output system device shown in FIG. 23 is stored as a table shown in FIG. 24 so that an inputted value becomes the address of the table, and a value corresponding to the address is outputted as the correction value. An embodiment where the γ correction is applied only to the photograph document, but not to the character document can be considered.

An example of the gradation processing in the gradation processing section 1073 will be explained with reference to FIG. 25.

Figure 25:
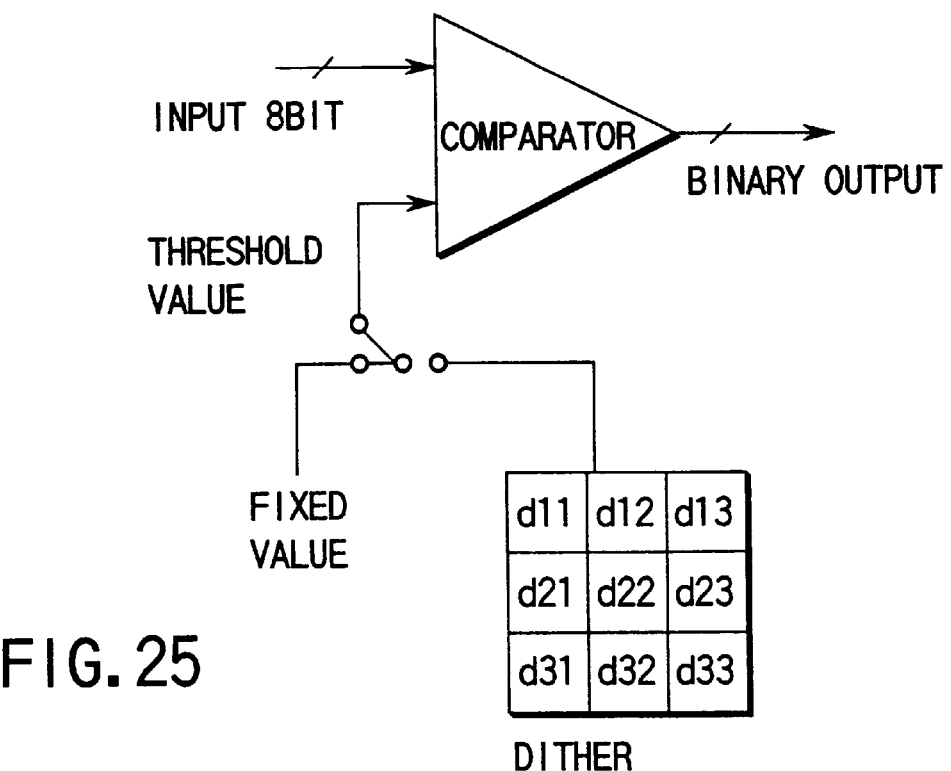
FIG. 25 is a diagram showing a configuration of a gradation processing section of FIG. 21.

In the configuration of the gradation processing section 1073 shown in FIG. 25, an inputted picture element is compared with a threshold, and depending on whether it is larger than the threshold or not, either "1" or "0" is outputted (binary output).

An output appropriate respectively for a character document or a photograph document, for example, a pseudo gradation is reproduced using a cyclic threshold matrix such as a dither for a document having a gradation, or a fixed threshold is used for a document having an edge storage such as a character document.

Although the dither processing is explained for facilitating understanding, other methods of a gradation processing, such as the error diffusion can be considered. Furthermore, it is also possible to apply the same gradation processing for all the documents, and find adjustment in character or photograph documents can be conducted by the above-mentioned filtering processing section 1071 or γ correction processing section 1072.

Figure 26:
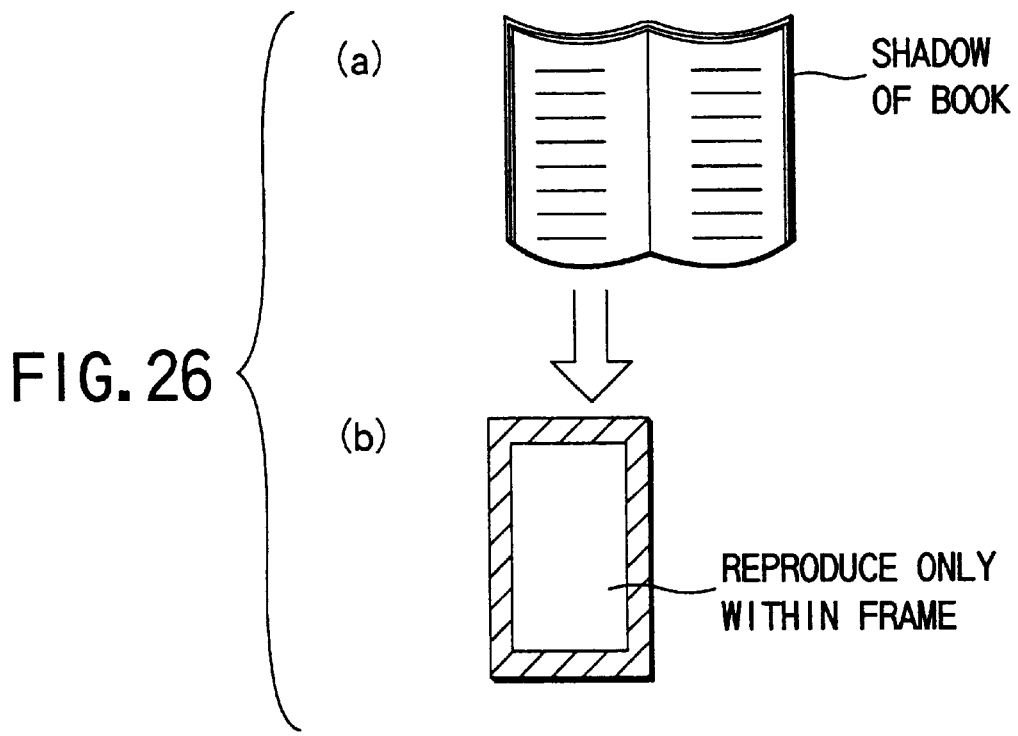
FIG. 26 is a conceptual diagram for explaining an unnecessary area deleting processing.

As shown in FIG. 26, the unnecessary area deleting process section 1074 is for eliminating an area unnecessary for copying, such as the outside of the document or the shadow of a book. As mentioned above, it is also possible to judge an unnecessary area in the document by instructing an area to be copied in the document by a separation sheet, or by an automatic recognition system (reference: TOK-KAIHEI 8-242,358) such as the structural analysis.

Figure 27:
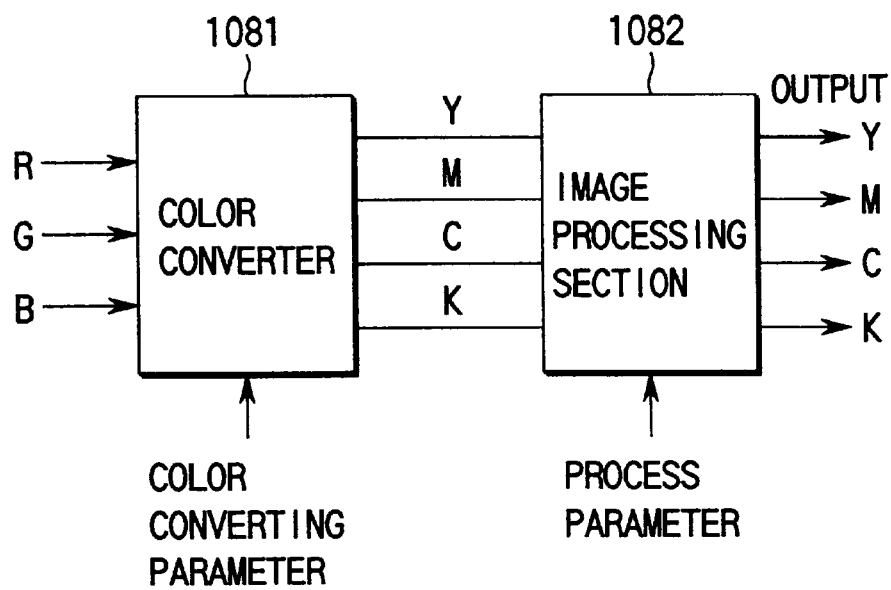
FIG. 27 is a chart showing a configuration of the main part of a color image processing section.

As shown in FIG. 27, the color image processing section 107*b* of FIG. 20 is for color-converting the values inputted from the manuscript per picture element, that is, red (R), green (G), and blue (B) to the three primary color data for controlling the color materials for color recording, that is, yellow (Y), magenta (M), and cyan (C), and black (K) at a color converter section 1081.

Then substantially the same processing as in the above-mentioned monochrome image processing section 107*a* is applied for each of the color-converted color component data Y, M, C, K (channel) at an image processing section 1082. According to the processing, a color image output can be achieved by conducting the four-color output by an outputting means 113 (see FIG. 1).

(8) Image delay means

The image delay means 108 of FIG. 1 is for temporarily storing an image (inputted image) read by the image reading means 102. It comprises a DRAM or an FIFO.

As the delay time, the time for recognizing a separation sheet by the separation sheet recognition means 105 is the minimum necessary time, and an error processing later described, a storage capacity corresponding to one or a plurality of pages is necessary.

Figure 28:
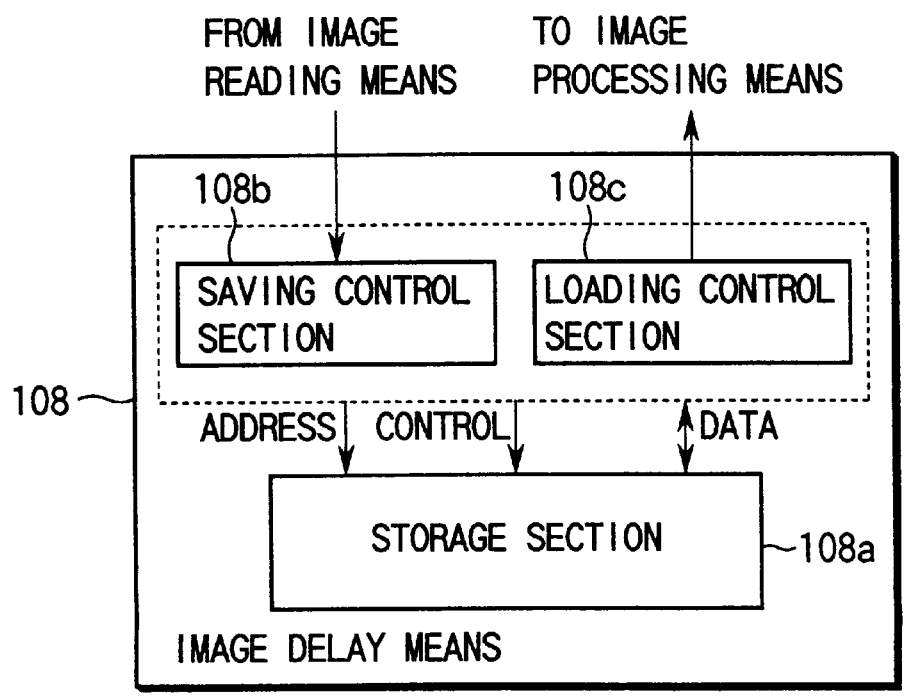
FIG. 28 is a chart showing a configuration of an image delay means.

A configuration of the image delay means 108 is shown in FIG. 28.

As shown in FIG. 28, the image delay means comprises a storage section 108*a*, a saving control section 108*b*, and a loading control section 108*c*. An inputted image supplied from the image reading means 102 (see FIG. 1) is written in the storage section 108*a* under the control of the saving control section 108*a*. After a predetermined delay time, the image is read from the storage section 108*a* by the loading control section 108*c* by the first-in first-out method (read-according to the order of write-in) to be supplied to the image processing means 107 (see FIG. 1).

The output from the image reading means 102 (see FIG. 1) is also supplied to the separation sheet recognition means 105 directly.

(9) Image storage controlling means

Figure 29:
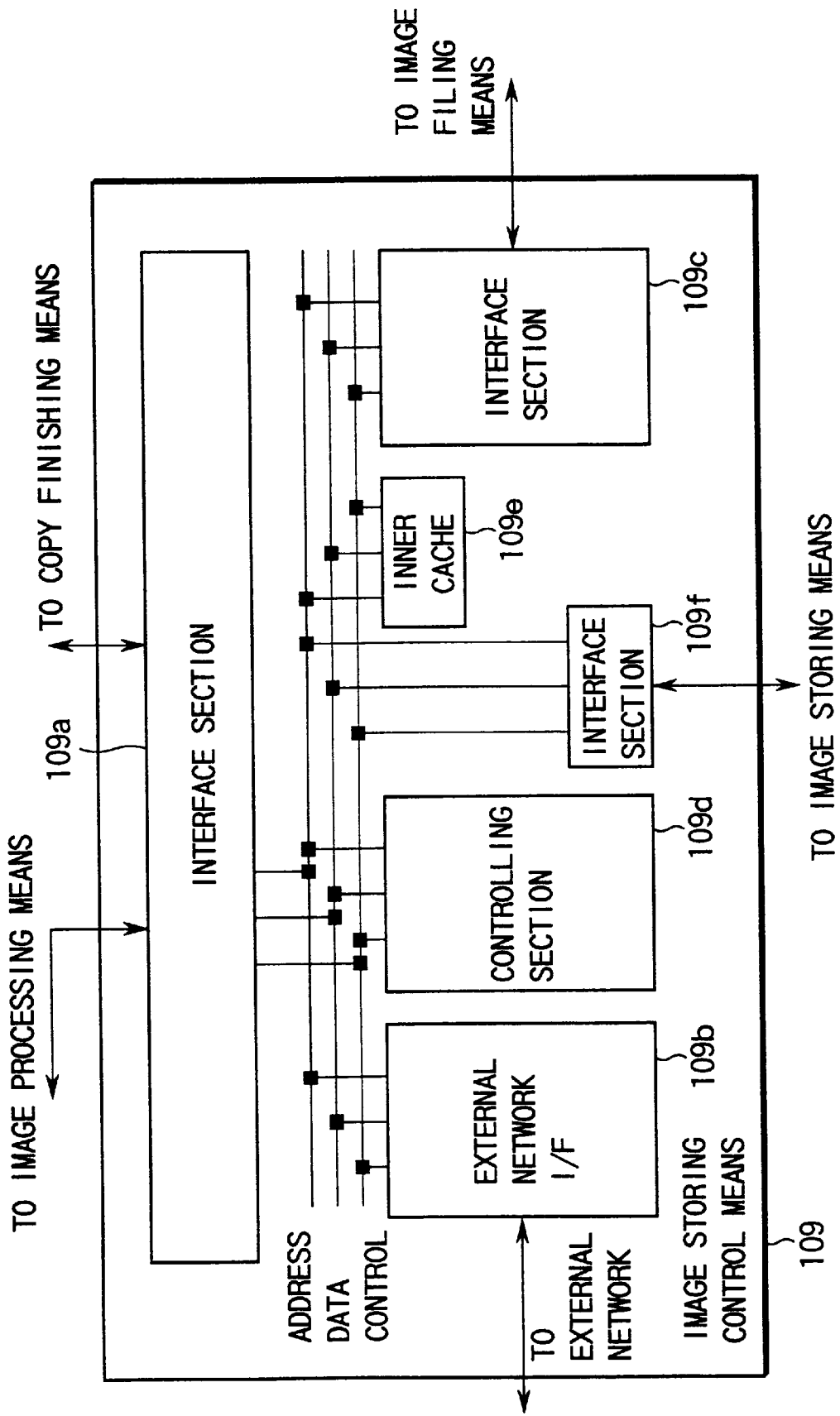
FIG. 29 is a chart showing a configuration of an image storing control means.

Then the image storage controlling means 109 will be explained. As shown in FIG. 29, the image storage controlling means 109 mainly comprises an interface section 109*a* for the image processing means 107 and the copy finishing means 112, an external network I/F section 109*b*, an interface section 109*c* for the image file means, a controlling section 109*d*, and an interface section 109*f* for the image storage means.

The interface sections 109*a*, 109*b*, 109*c*, and 109*f* are for the exchange of the image data with corresponding processing means, networks, image filing means or image storage means under the control of the controlling section 109*d*.

(10) Image storing means

The image storing means 110 of FIG. 1 stores an image processed by the image processing means 107, an image filed by the image filing means 117, and the image data supplied from the outside through the network via the image storage controlling means 109. As needed, it supplies the stored data to the image processing means 107, the copy finishing means 112, the image filing means 117 or the network via the image storage controlling means 109.

(11) Copy finishing control means

Figure 30:
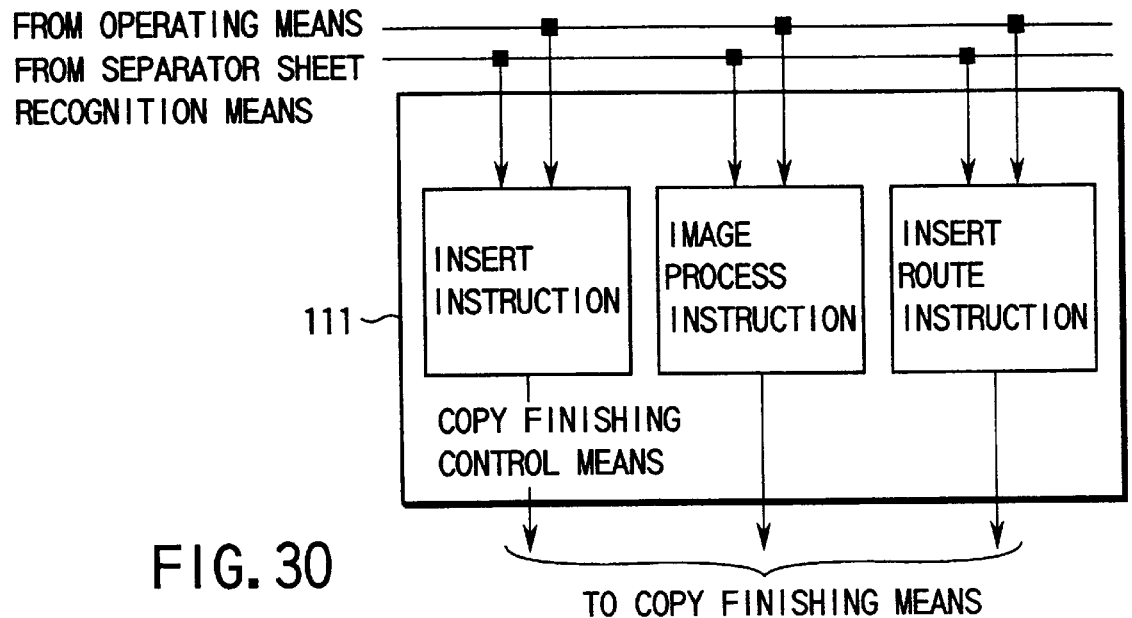
FIG. 30 is a chart for explaining the function of a copy finishing control means.

As shown in FIG. 30, the copy finishing control means of FIG. 1 is for instructing, for example, the insertion of an image applied with a specific processing, the necessary image processing instruction, the insertion route of an image data, and the like to the copy finishing means 112 according to the set value designated through the operating means 103 and stored in the setting value storing means 104, and the content recognized by the separation sheet recognition means 105.

(12) Copy finishing means

The copy finishing means 112 of FIG. 1 is for conducting a desired copy finishing by receiving the instruction on insertion, processing, the route of the data, and the like from the copy finishing control means 111, and informing the instruction to the image storing means 110.

Figure 31:
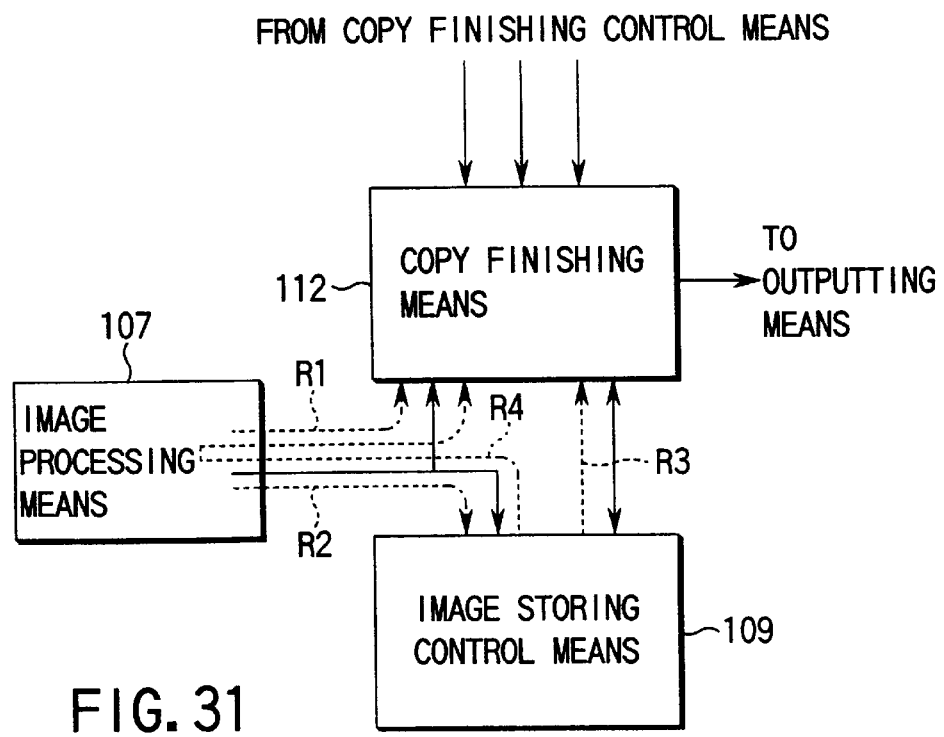
FIG. 31 is a chart for explaining the route of data to be controlled by a copy finishing means.

With reference to FIG. 31, an example of a copy finishing procedure will be explained.

In FIG. 31, image data outputted from the image processing means 107 are sent to the copy finishing means 112 in an ordinary copy finishing (R1). Insertion image data of the same job as the image of the ordinary copy finishing are temporarily stored in the image storing means 110 via the image storage controlling means 109 (R2). At the time, the operation of the copy finishing means 111 is temporarily stopped. When it reaches at a preliminarily instructed insertion position in the copy processing (R1), that is, in the insertion mode (R3), the image data stored preliminarily in R2 are read from the corresponding address to be inserted (R4). The image data inserted at R4 are image-processed temporarily as needed in the specific processing such as the external data, the filed data, and the many-in-1.

(13) Outputting means, job sorting means, job sorting control means

The outputting means 113, the job sorting control means 114, and the job sorting means 115 will be explained with reference to FIG. 3, FIG. 32, and FIG. 33.

The operation of each section to serve as the outputting means 113 in the apparatus main body 10 will be explained with reference to FIG. 3.

As shown in FIG. 3, from the image data (electric signal) applied with processing such as the image processing outputted from the copy finishing means 112, a toner image is formed on the photosensitive member drum 36 by a laser writing section with a laser light beam. That is, the pair of the resist rollers 58 are driven at a predetermined timing with respect to the image forming operation for a predetermined time (for example, 0.5 second for an A4 copying paper). Accordingly, the copying paper P is conveyed through the transfer section between the photosensitive member drum 36 and the transfer charger 40 so as to form a toner image on the copying sheet P. The copying sheet P is further conveyed to the fixing device 53 by the conveyance belt 60, then conveyed to the paper discharging roller 62 after fixing the toner image.

The operation of each section to serve as the job sorting control means 114, and the job sorting means 115 in the apparatus main body 10 will be explained with reference to FIG. 3, FIG. 32, and FIG. 33.

With the driving of the pair of the resist rollers 58, a solenoid 95 is excited and the flapper 94 is switched to the sorting position at the same time as well as various kinds of rollers in the sorter 71 and the conveyance belt 98 are driven. A sorting head 96 is maintained in the position facing to the sorting tray at the uppermost part (first sorting tray) 75 at the time of starting the copying operation.

Accordingly, the copying paper discharged from the discharging opening 54 of the apparatus main body 10 by the pair of the discharging rollers 62 to be sent into the sorter 71 is sent to the sorting path 105 by the flapper 94 and the guide roller 97, and further, conveyed to the sorting head 96 by the conveyance belt 98. The copying paper P is gathered at the first sorting tray 75 by the feeding roller 96a of the sorting head 96.

Papers P picked up one by one from the first or second paper cassette 48, 50 by the pick-up roller 56 are sent to the pair of the resist rollers 58 by the pair of the paper feeding rollers 57. The copying papers P are sent to the transfer section after being aligned by the pair of the resist rollers 58. A developer image formed on the photosensitive member drum 36, that is, a toner image is transferred onto a paper P by the transfer charger 40.

The copying paper P with the toner image transferred thereon is removed from the surface of the photosensitive member drum 36 by the AC corona discharge from an eliminating charger 39 or by the function of an eliminating nail 42, and conveyed to the fixing device 53 via the conveyance belt 60 comprising a part of the conveyance path 52. After the melt-fixing of the developer image on the copying paper P by the fixing device, the paper P is discharged from the discharging opening 54 by the pair of paper feeding rollers 61 and the pair of the paper discharging rollers 62.

A reversing mechanism 64 is provided below the conveyance path 52 for reversing and sending a copying paper P passed through the fixing device 53 to the pair of the resist rollers 58 again. The reversing mechanism 64 comprises a temporary gathering section 65 for temporarily gathering copying papers P, a reversing path 66 stemmed from the conveyance path 52 for reversing and introducing a copying paper P passed through the fixing device 53 to the temporary gathering section 65, a pick-up roller 67 for picking up the copying papers P gathered on the temporary gathering section one by one, and a paper feeding roller 69 for feeding a picked-up paper to the pair of the resist rollers 58 through the conveyance path 68. A sorting gate 70 is provided at the branch part between the conveyance path 52 and the reversing device 66 for selectively sorting the copying papers P to the discharging opening 54 or the reversing device 66.

In the case of both side copying, copying papers P passed through the fixing device 53 are introduced to the reversing path 66 by the sorting gate 70, and temporarily gathered at the temporary gathering section 65 in the reversed state. Then they are sent to the pair of the resist rollers 58 by the pick-up roller 67 and the pair of the paper feeding rollers 69 through the conveyance path 68. The papers P are sent to the transfer section again after being aligned by the pair of the resist rollers 58 so that a toner image is transferred onto the reverse side of the copying paper P. Then the copying paper P is discharged onto the paper discharging tray 55 via the conveyance path 52, the fixing device 53 and the paper discharging roller 62.

Figure 32:
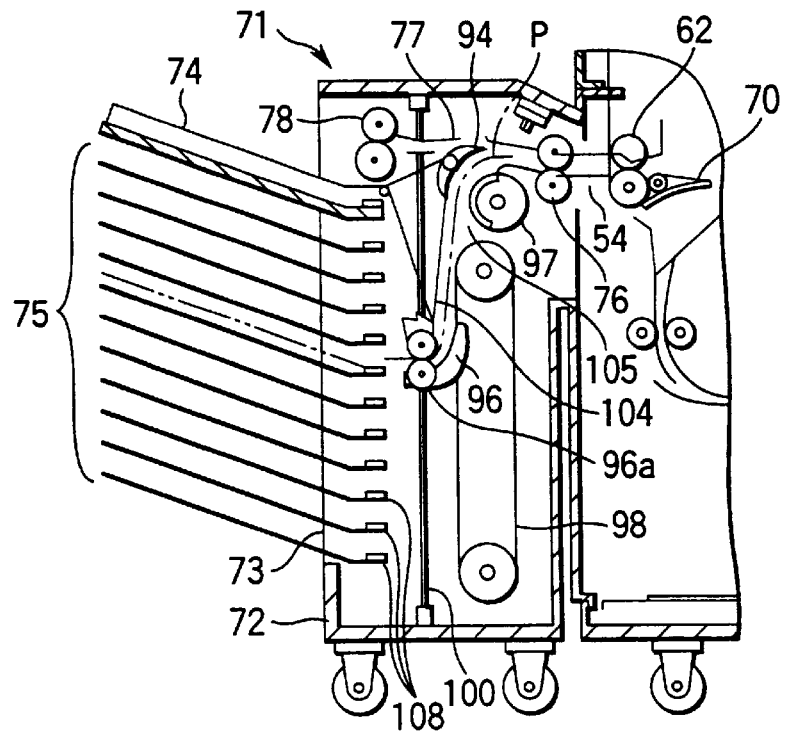
FIG. 32 is a diagram showing a mechanical configuration of the embodiment of an image forming apparatus for explaining the configuration mainly of the portions (sorter) functioning as the job sorting control means, and the job sorting means of FIG. 1.

As shown in FIG. 3 and FIG. 32, the copier comprises a sorter 71 for optionally sorting and gathering many sheets of copying papers P after copying discharged from the discharging opening 54 of the apparatus main body 10.

The sorter 71 has a housing 72 connected to the discharging opening 54 and arranged parallel to the apparatus main body 10. The housing 72 has an opening 73 in the opposite side surface with respect to the apparatus main body 10. The housing 72 is provided with many trays for gathering copying papers P discharged from the apparatus main body 10 in the laminated state along the vertical direction. These trays include a non-sort tray 74 in the uppermost position and many sorting trays 75 laminated with a predetermined gap in-between below the non-sort tray. The non-sort tray 74 and the sorting trays 75 elongate from the opening 73 to the outside of the housing 72.

The housing 72 accommodates a pair of entrance rollers 76 arranged adjacent to the discharging opening 54, a pair of outlet rollers 78 for discharging copying papers P conveyed by the entrance rollers 76 through a discharging path 77 onto the non-sort tray 74, the flapper as a sorting means provided between the pair of the entrance rollers and the pair of the outlet rollers, and the sheet sensor 103 provided between the entrance rollers and the flapper for detecting the arrival of the copying papers P.

Figure 33:
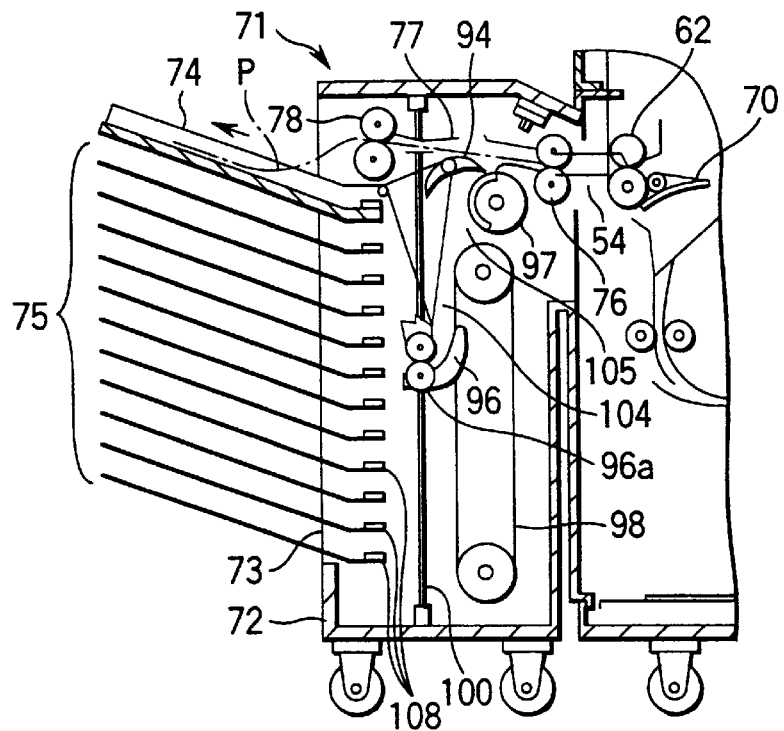
FIG. 33 is a diagram showing a mechanical configuration of the embodiment of an image forming apparatus for explaining the configuration mainly of the portions (sorter) functioning as the job sorting control means, and the job sorting means of FIG. 1.

The flapper 94 is provided rotatably between the discharging position shown in FIG. 33 for guiding a copying paper P sent from the entrance rollers 76 to the outlet rollers 78 and the sorting position for guiding the copying paper sent from the entrance roller 76 to the sorting tray 75 side such that it can be switched between these positions by the solenoid 95.

As shown in FIG. 3, FIG. 32, FIG. 33, the sorter 71 comprises the sorting head 96 movable in the vicinity of the tray edges in the laminating direction of the sorting trays 75, that is, along the vertical direction, a guide roller 97 provided between the entrance rollers 76 and the flapper 94, and the conveyance belt 98 provided along the vertical direction below the guide roller 97. The entrance rollers 76, the outlet rollers, 87, the guide roller 97 and the conveyance belt 98 are driven by a feeding motor 106 later described.

The sorting head 96, serving as the sorting means, is supported by a guide rod 100 elongating in the vertical direction, and driven vertically by an elevating motor 102 later described. The sorting head 96 is attached with a pair of feeding rollers 96a. A guide sheet 104, which extends or contracts according to the elevating operation of the sorting head, is provided between the sorting head 96 and the flapper 94. And a sorting path 105, which elongates from the flapper 94 to the sorting head 96, is formed between the guide sheet, and the guide roller 97 and the conveyance belt 98.

As shown in FIG. 32, with the flapper 94 switched to the sorting position, a copying paper P discharged from the discharging opening 54 of the apparatus main body 10 is sent by the entrance rollers and guided to the sorting path 105 by the flapper 94 and the guide roller 97. Further, the copying paper P is sent to the sorting head 96 by the conveyance belt 98, and discharged onto the sorting tray 75 facing to the sorting head 96 by the feeding rollers 96a.

Position detecting sensors 108 are provided at the edge part of the non-sort tray 74 and the sorting trays 75. The position of the sorting head 96 is detected by the position detecting sensors 108.

The job sorting means 114 has sorter functions such as stack, and butting, and other functions such as stapling per a job unit.

(14) Image file controlling means

The image file controlling means 116 of FIG. 1 is for reading preliminarily filed document data from the image filing means 117 by the instruction from the operating means 103 or the separation sheet recognition means 105, and storing them in the image storing means 110 through the above-mentioned image storage controlling means 109 so that insertion and re-output of the filed documents can be enabled by reading them by the copy finishing means 112 and applying image processing as needed.

(15) Image filing means

The image filing means 117 is a well-known simple image file means for applying the ID, date, and the like to each job and recording temporarily. If the file capacity becomes short, stored jobs are eliminated from the oldest one so as to allow storage of new jobs.

(16) System controlling/managing means

The system controlling/managing means 118 is for controlling/managing the apparatus main body as a whole. It generates a clock for all the blocks, a control signal, a timing controlling signal for exchange among the blocks, and the like to be supplied to the corresponding block.

(17) Auto recognition means

The auto recognition means is for detecting the characteristic or the complexity of the inputted document, exchanging the detected information with the setting value storing means 104, the image processing means 107, and the like, checking whether or not an error is included in the user's instruction, and requiring a test printing in the corresponding optimum setting if there is an error. Further, it also requires a test printing for a document of a high complexity.

Then the operation of the image forming apparatus (copier) of FIG. 1 will be explained.

First, the terms used in the explanation below are defined.

A general document means mainly a document to be read out, which can be dealt with by the ADF.

A general copy means mainly a copy of an image on a general document on a predetermined paper.

A specific document means a document, which cannot be dealt with by the ADF, but should be applied with a specific processing, such as a document from a book/magazine.

A specific copy means a copy of an image on a specific document on a predetermined paper.

A specific processing means the different image processing in the case a different image processing is applied to some documents from a plurality of documents.

A job means one processing unit in conducting a copying processing in a copier, which is instructed by the user.

Figure 34:
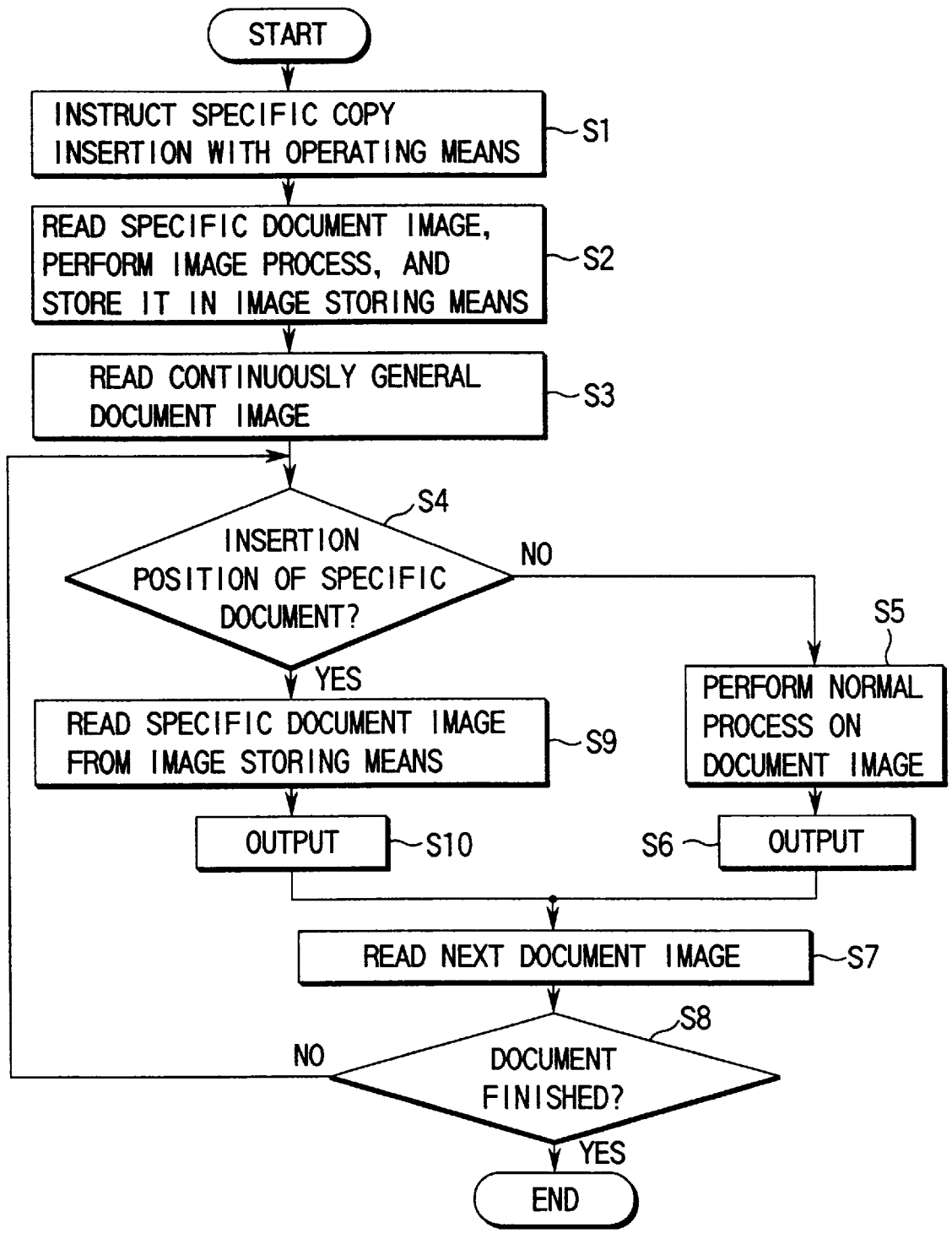
FIG. 34 is a flow chart for explaining the operation of the image forming apparatus of FIG. 1 in the case the insertion position of a specific document is instructed by the operating means.

(18) Operation explanation A: insertion of copying of a document, which cannot be dealt with by the ADF to a position instructed by the operating means The operation of the image forming apparatus (copier) of FIG. 1 will be explained with reference to the flow chart of FIG. 34 by an example of copying a plurality of (for example, 100 sheets) documents (standard documents) by the ADF (automatic feeder) means 101, and inserting copying of a document (specific document), which cannot be dealt with by the ADF (automatic feeder) means 101, such as a book/magazine.

Figure 35:
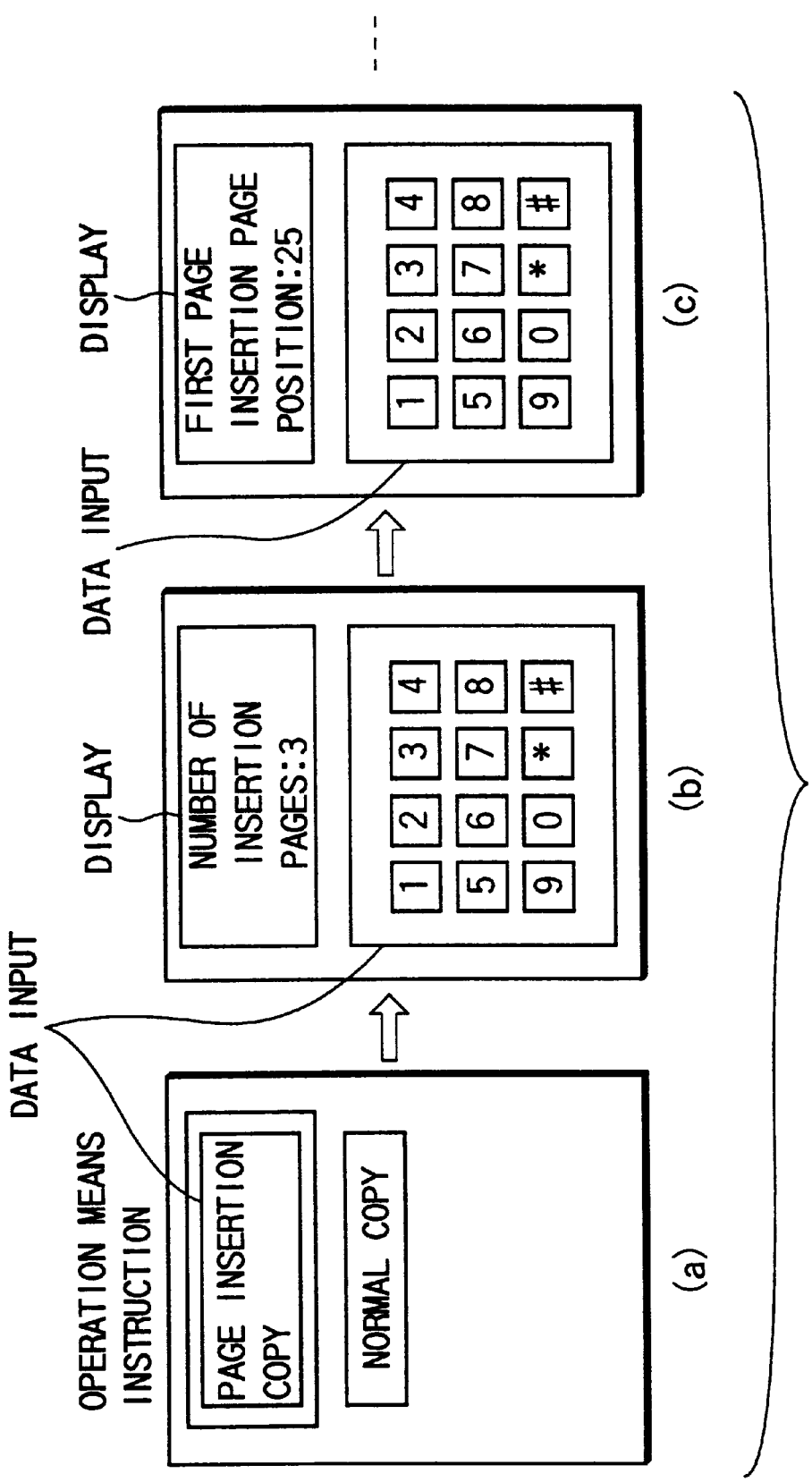
FIG. 35 is a diagram for explaining the instruction inputting procedure of the operating means.

Step S1: As shown in FIG. 35(a), by selecting the insertion mode, which is a specific copying mode from the operating means 103 of FIG. 1, and instructing the information, such as the number of the pages of the specific copying to be inserted (see FIG. 35(b)), and the insertion position (see FIG. 35(c)), the set value is stored in the setting value storing means 104.

Step S2: After placing a specific document such as a book/magazine on the document table of the image reading means 102, reading the image of the specific document, and conducting a predetermined image processing by the image processing means 107, it is stored in the image storing means 110 via the image storage controlling means 109.

Steps S3 to S6: A plurality of standard documents are read by the ADF means 101 and the image reading means 102, applied with a predetermined image processing by the image processing means 107, and outputted from the outputting means 113 via the copy finishing means 112.

Step S4: At the preliminarily set insertion position of the specific document in the processing of the standard documents, the ADF means 101 and the image reading means 102 are temporarily stopped.

Step S9: Information on the specific copy insertion is supplied from the setting value storing means 104 to the copy finishing control means 111, and further, the specific copy insertion instruction is supplied from the copy finishing control means 111 to the copy finishing means 110.

Step S10: A specific document image stored beforehand in the image storing means 110 is read by the copy finishing means 112 via the image storage controlling means 109, and is outputted from the copy outputting means 113 as a specific copy.

Steps S7 to S8: After the insertion operation of the specific copy, the ADF means 101 and the image reading means 102 resume the operation to restart the continuous reading, image processing, output of the standard documents. Until the set documents are done, the steps S4 to S7 are repeated.

Accordingly, by instructing the insertion position of a specific copy among standard copies, the pages to be inserted, and the like, in advance by the operating means 103, a plurality of specific copies can be .inserted continuously or independently to different positions with a simple instruction so that the time conventionally required in arranging copied documents and labor required in the insertion instruction of a specific copy can be omitted. In particular, in the case insertion of a plurality of specific copies is required, or the number of the sets of copying is large, it is advantageous in terms of the user's convenience.

Figure 36:
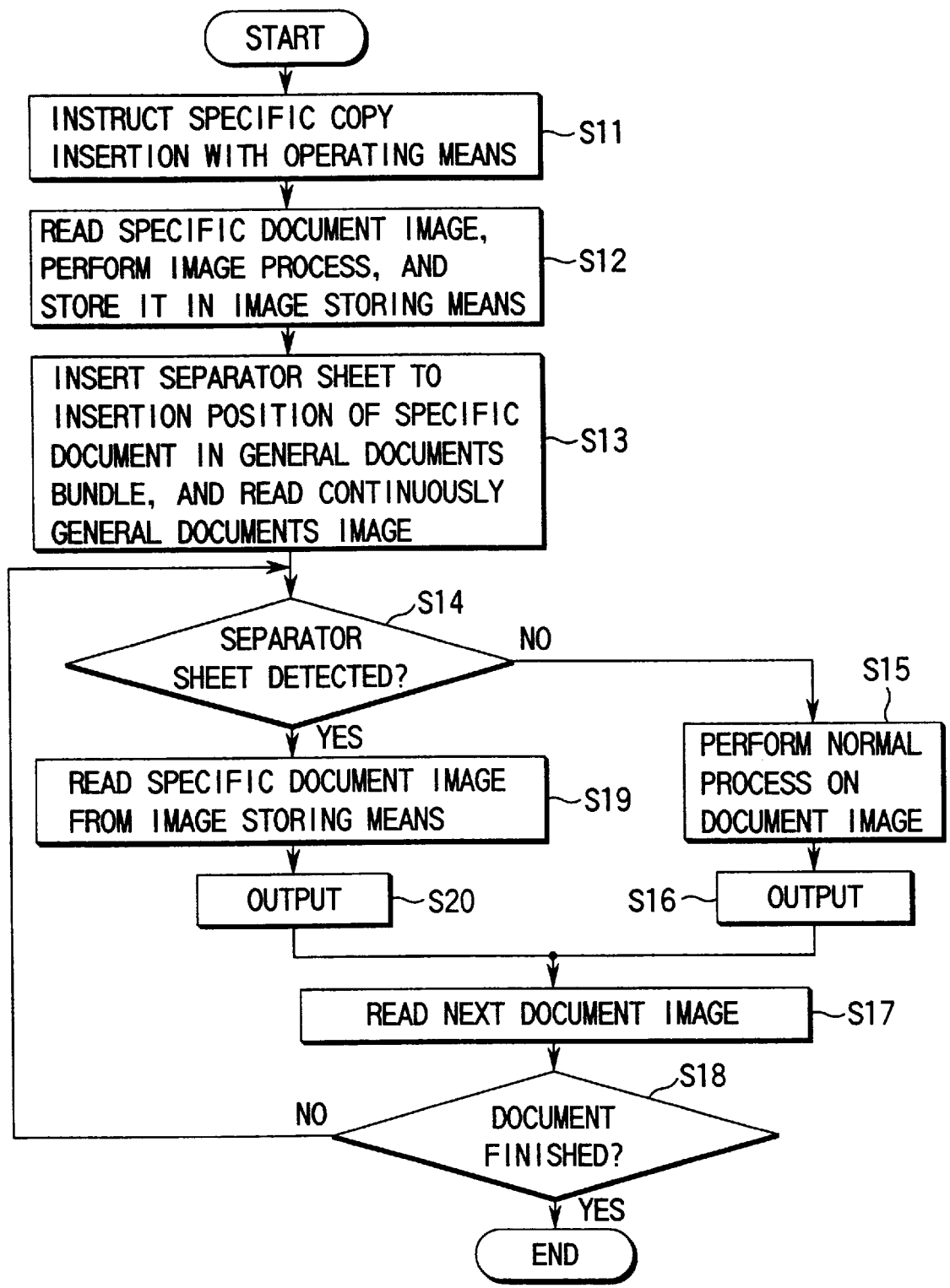
FIG. 36 is a flow chart for explaining the operation of the image forming apparatus of FIG. 1 in the case the insertion position of a specific document 5 is instructed by a separation sheet.

(19) Operation explanation B: insertion of a document, which cannot be dealt with by the ADF, to the position where a separation sheet is inserted The operation of the image forming apparatus (copier) of FIG. 1 will be explained with reference to the flow chart of FIG. 36 by an example of copying a plurality of (for example, 100 sheets) documents (standard documents) by the ADF (automatic feeder) means 101, and inserting copying of a document (specific document), which cannot be dealt with by the ADF (automatic feeder) means 101, such as a book/magazine.

Step S11: As shown in FIG. 35(a), the insertion mode, which is a specific copying mode, is selected from the operating means 103 of FIG. 1.

Step S12: After placing a specific document such as a book/magazine on the document table of the image reading means 102, reading the image of the specific document, and conducting a predetermined image processing by the image processing means 107, it is stored in the image storing means 110 via the image storage controlling means 109.

Figure 37:
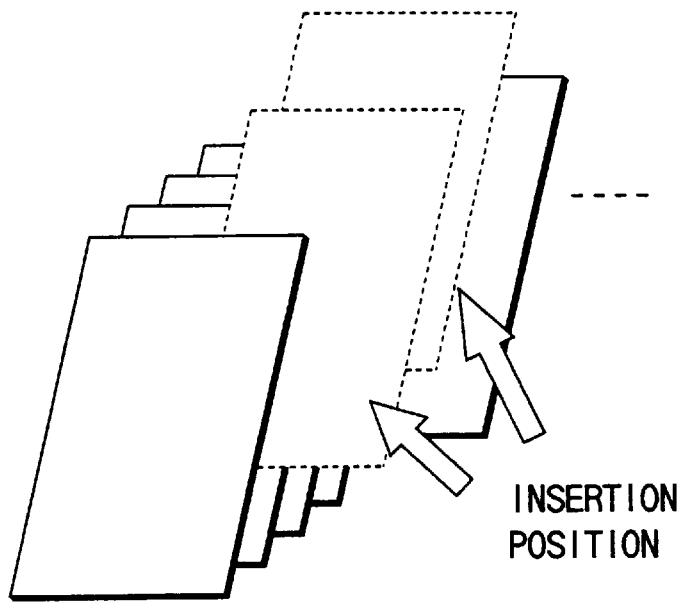
FIG. 37 is a diagram for explaining the insertion position of a separation sheet into a bundle of documents.

Steps S13 to S16: A separation sheet is inserted in a standard document bundle as shown in FIG. 37, and the document bundle is set at a predetermined position of the ADF means 101 so that the plurality of documents are read by the image reading means 102, applied with a predetermined image processing by the image processing means 107, and outputted from the outputting means 113 via the copy finishing means 112.

Steps S14, S19: When the separation sheet is recognized by the separation sheet recognition means 105 in the processing of standard documents, the information of the insertion position, and the like is supplied to the copy finishing control means 111, and further, the insertion instruction of the specific copy is given from the copy finishing control means 111 to the copy finishing means 110.

Step S20: A specific document image stored beforehand in the image storing means 110 is read by the copy finishing means 112 via the image storage controlling means 109, and is outputted from the copy outputting means 113 as a specific copy.

Steps S17 to S18: After the insertion operation of the specific copy, the ADF means 101 and the image reading means 102 resume the operation to restart the continuous reading, image processing, output of the subsequent documents set on the ADF means. Until the set documents are done, the steps S14 to S17 are repeated.

Accordingly, by inserting a separation sheet at a desired position in a document bundle, a plurality of specific copies can be inserted continuously or independently to different positions with a simple instruction so that the time conventionally required in arranging copied documents and labor required in the insertion instruction of a specific copy can be omitted. In particular, in the case insertion of a plurality of specific copies is required, or the number of the sets of copying is large, it is advantageous in terms of the user's convenience.

(20) Operation explanation C: instructing specific processing and insertion of a specific document by the operating means An example of applying a different image processing to one document from a plurality of documents (for example, to apply a color image processing to the one document whereas a monochrome image processing is applied to the other documents) will be explained with reference to the flow chart of FIG. 34. In the case a different image processing is applied to a part of a plurality of documents, the image processing to be applied to the part of the documents is referred to as a specific processing herein. Examples of the specific processing include the unnecessary area deleting processing.

Figure 38:
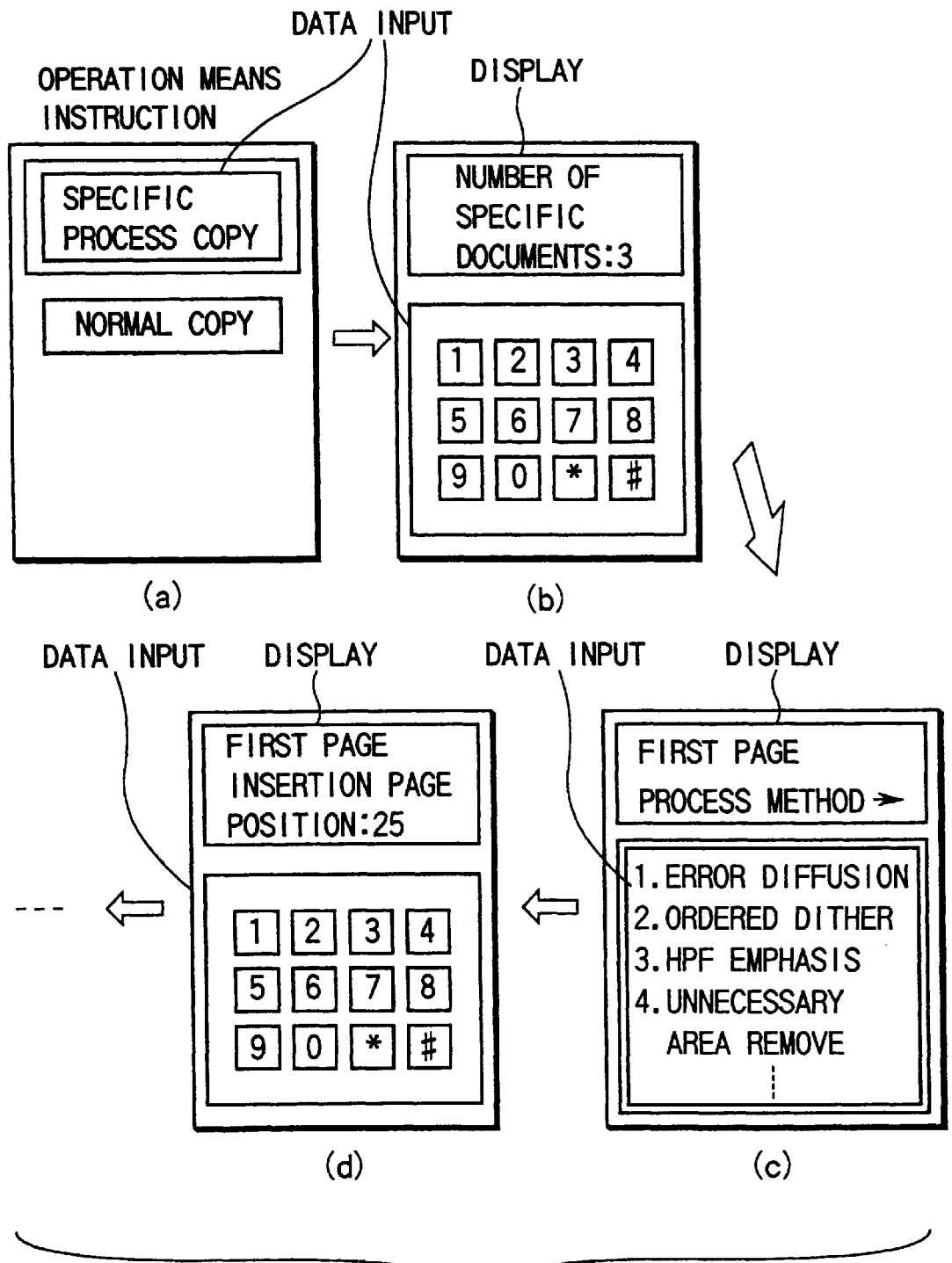
FIG. 38 is a diagram for explaining the instruction inputting procedure of an operating means.

Step S1: As shown in FIG. 38(a), by selecting the specific processing mode from the operating means 103 of FIG. 1, and instructing the information, such as the number of the pages (see FIG. 38(b)) of the documents to be applied with the specific processing (specific documents), the specific processing (see FIG. 38(c)), and the insertion position of the specific copy applied with the specific processing (see FIG. 38(d)), the set value is stored in the setting value storing means 104.

Step S2: The image of the specific document is read by the ADF means 101 and the image reading means 102. The image processing control means 106 sets the image processing based on the value stored in the setting value storing means 104. After conducting specific processing by the image processing means 107 based on the setting, it is stored in the image storing means 110 via the image storage controlling means 109.

Steps S3 to S6: A plurality of standard documents are read by the ADF means 101 and the image reading means 102, applied with a predetermined image processing by the image processing means 107, and outputted from the outputting means 113 via the copy finishing means 112.

Step S4: At the preliminarily set insertion position of the specific document in the processing of the standard documents, the ADF means 101 and the image reading means 102 are temporarily stopped.

Step S9: Information on the specific copy insertion is supplied from the setting value storing means 104 to the copy finishing control means 111, and further, the specific copy insertion instruction is supplied from the copy finishing control means 111 to the copy finishing means 110.

Step S10: A specific document image stored beforehand in the image storing means 110 is read by the copy finishing means 112 via the image storage controlling means 109, and is outputted from the copy outputting means 113 as a specific copy.

Steps S7 to S8: After the insertion operation of the specific copy, the ADF means 101 and the image reading means 102 resume the operation to restart the continuous reading, image processing, output of the standard documents. Until the set documents are done, the steps S4 to S7 are repeated.

Accordingly, by instructing the insertion position of a specific copy among standard copies, the pages to be inserted, and the like, in advance by the operating means 103, the specific processing of a specific copy and the insertion instruction can be simplified. Conventional waste of applying to all the documents a specific processing such as the unnecessary area deleting processing required to a part of the documents can be omitted so that the operation time can be shortened as well as the copying operation can be conducted efficiently. Further, it is advantageous in terms of the user's convenience.

(21) Operation explanation D: instructing insertion of a specific document to be applied with a specific processing to the position where a separation sheet is inserted An example of applying a different image processing to one document from a plurality of documents (for example, to apply a color image processing to the one document whereas a monochrome image processing is applied to the other documents) will be explained with reference to the flow chart of FIG. 36.

Figure 39:
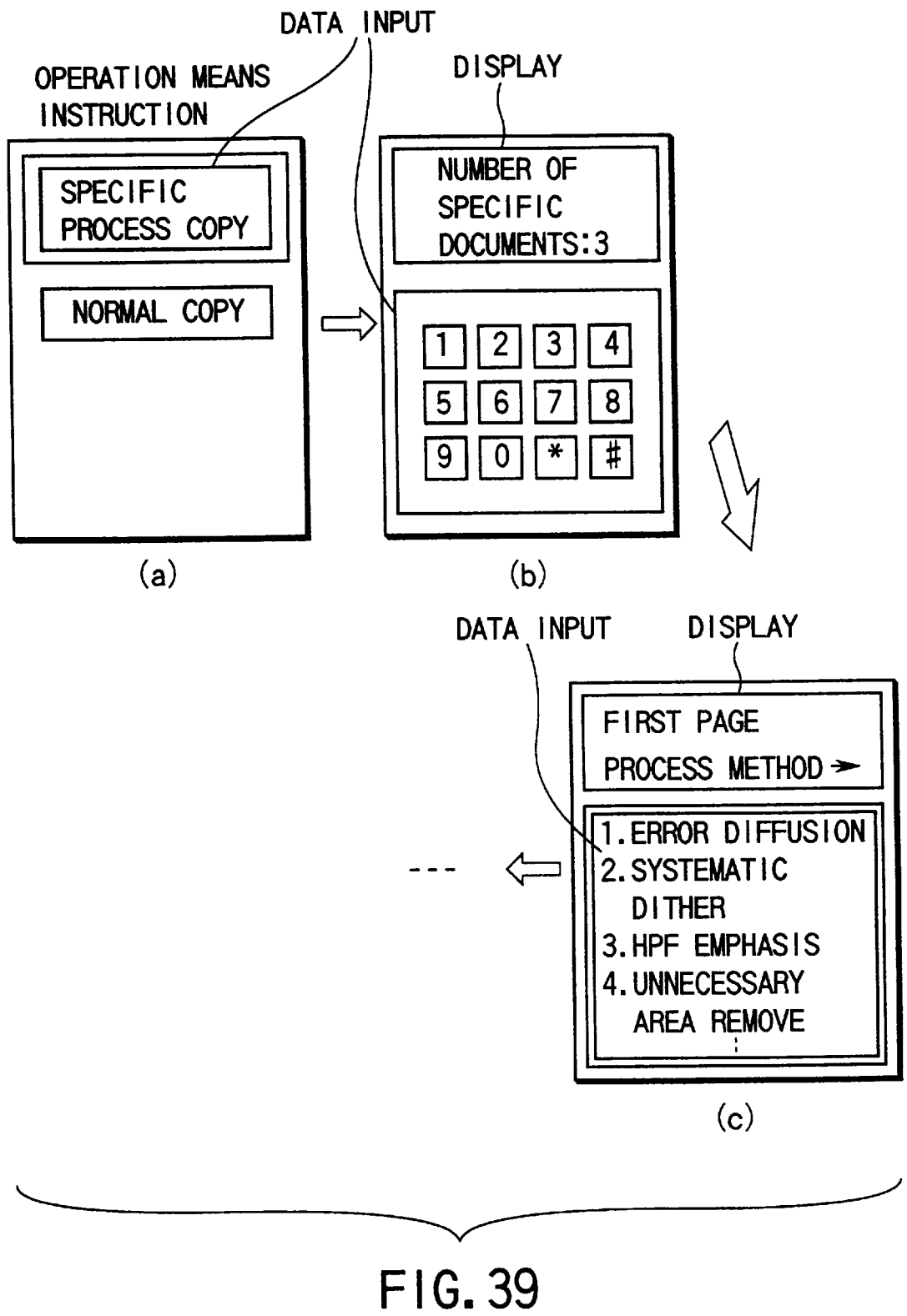
FIG. 39 is a diagram for explaining the instruction inputting procedure of an operating means.

Step S11: As shown in FIG. 39(a), by selecting the insertion mode, which is a specific copying mode, from the operating means 103 of FIG. 1, and instructing the information, such as the number of the pages (see FIG. 39(b)) of the documents to be applied with the specific processing (specific documents), and the specific processing (see FIG. 39(c)), the set value is stored in the setting value storing means 104.

Step S12: The image of the specific documents is read by the ADF means 101 and the image reading means 102 in the insertion order. The image processing control means 106 sets the image processing based on the value stored in the setting value storing means 104. After conducting specific processing by the image processing means 107 based on the setting, it is stored in the image storing means 110 via the image storage controlling means 109.

Steps S13 to S16: A separation sheet is inserted in a standard document bundle as shown in FIG. 37, and the document bundle is set at a predetermined position of the ADF means 101 so that the plurality of documents are read by the image reading means 102, applied with a predetermined image processing by the image processing means 107, and outputted from the outputting means 113 via the copy finishing means 112.

Steps S14, S19: When the separation sheet is recognized by the separation sheet recognition means 105 in the processing of the standard documents, the information of the insertion position, and the like is supplied to the copy finishing control means 111, and further, the insertion instruction of the specific copy is given from the copy finishing control means 111 to the copy finishing means 110.

Step S20: A specific document image stored beforehand in the image storing means 110 is read by the copy finishing means 112 via the image storage controlling means 109, and is outputted from the copy outputting means 113 as a specific copy.

Steps S17 to S18: After the insertion operation of the specific copy, the ADF means 101 and the image reading means 102 resume the operation to restart the continuous reading, image processing, output of the subsequent documents set on the ADF means. Until the set documents are done, the steps S14 to S17 are repeated.

Accordingly, by instructing the specific processing of the specific copy to be inserted in standard copies and instructing the insertion position of the specific copy by the position of a inserted separation sheet, the specific processing of a specific copying and the insertion instruction can be simplified. Conventional labor in the insertion operation of a specific copy, or waste of applying to all the documents a specific processing such as the unnecessary area deleting processing required to a part of the documents can be omitted so that the operation time can be shortened as well as the copying operation can be conducted efficiently. Further, it is advantageous in terms of the user's convenience.

Figure 40:
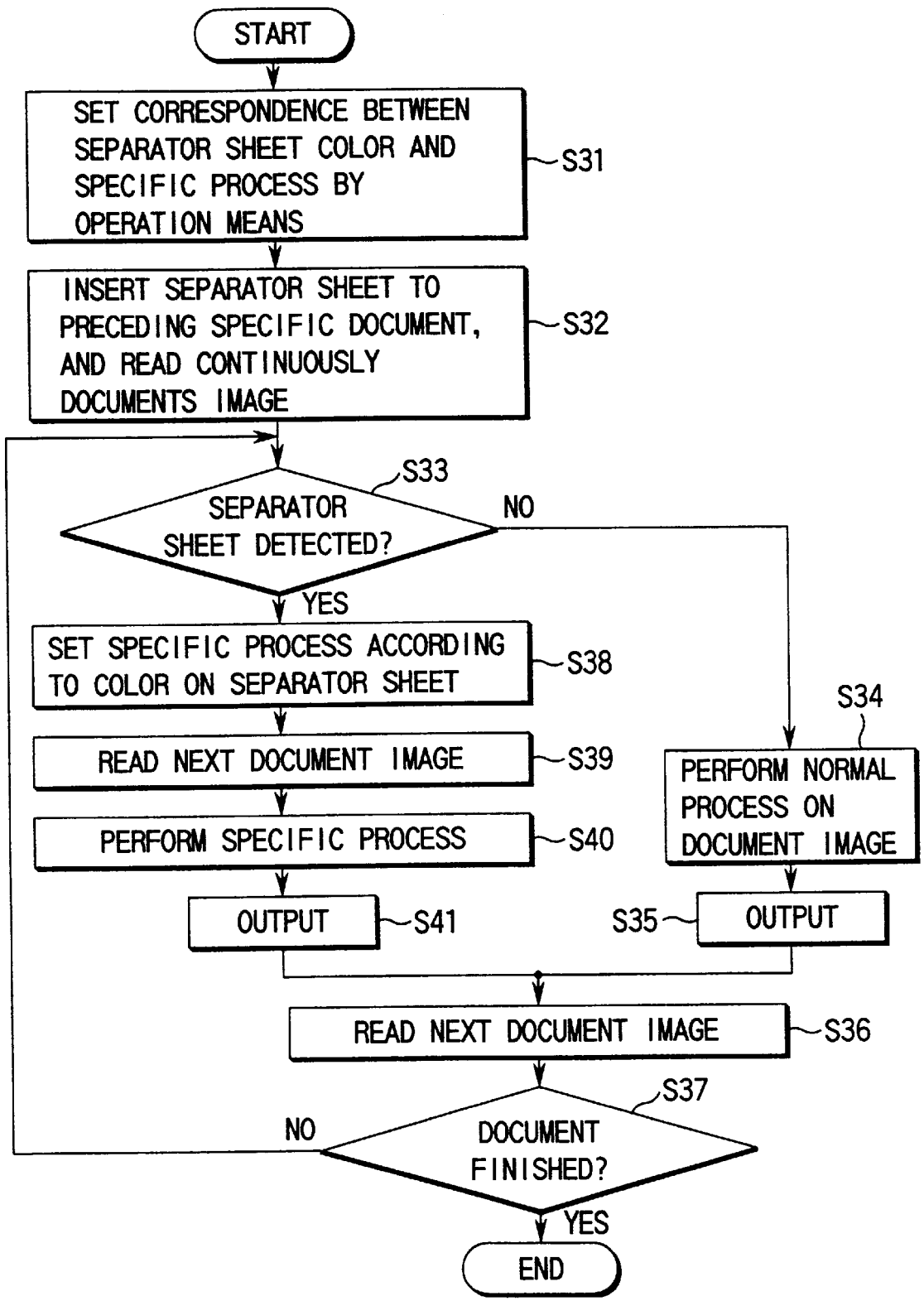
FIG. 40 is a flow chart for explaining the operation of the image forming apparatus of FIG. 1 in the case the insertion position of a specific document and a specific processing are detected by a separation sheet.

(22) Operation explanation E: instructing a specific processing of a specific document by a separation sheet inserted in documents An example of applying a different image processing to one document from a plurality of documents set on the ADF (automatic document feeder) means 101 (for example, to apply a color image processing to the one document whereas a monochrome image processing is applied to the other documents) will be explained with reference to the flow chart of FIG. 40.

Step S31: A specific processing such as a color image processing, an unnecessary area deleting processing, and the like) and a separation sheet are matched by the operating means 103 of FIG. 1.

For example, a red separation sheet is matched to an image processing for a photograph, and a blue separation sheet is matched to an unnecessary area deleting processing. The matching set here is stored, for example, in the recognition table provided in the separation informing means 506 of the separation recognition means 105.

Figure 41:
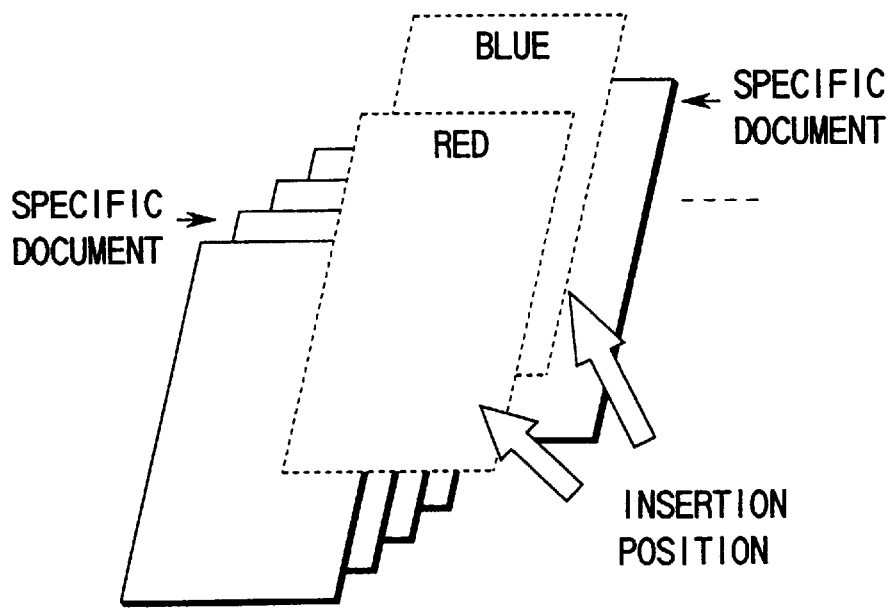
FIG. 41 is a diagram for explaining the insertion position of a separation sheet into a bundle of documents.

Steps S32 to S35: As shown in FIG. 41, a separation sheet is inserted before a specific document in a document bundle. The document bundle is set at a predetermined position of the ADF means 101 so that a plurality of documents are read by the image reading means 2, applied with an image processing by the image processing means 7, and outputted from the outputting means 13 via the copy finishing means 12.

Steps S33, S38 to S41: When the separation sheet is recognized by the separation sheet recognition means 105 in the processing of standard documents, the specific information corresponding to the color is read from the recognition table, supplied to the setting value storing means 104 and the image processing control means 106 for switching to the processing to be applied to the next specific document and parameter setting. Then the image of the specific document read by the image reading means 102 is applied with a specific processing instructed by the image processing means 107, and outputted from the outputting means 113.

Steps S17 to S18: After the specific processing of the specific copy, the image processing control means 107 switch to the conventional processing setting and parameter again for the standard copy finishing. The continuous reading, image processing, output of the subsequent documents set on the ADF means are continued. Until the set documents are done, the steps S33 to S37 are repeated.

Accordingly, by matching a specific processing (such as a color image processing, an unnecessary area deleting processing, and the like) and a separation sheet and inserting a separation sheet corresponding to a specific processing before a specific document in a document bundle by the operating means 103, the instruction for the position of a specific document, and the specific processing for the specific copying can be simplified as well as labor of inserting a specific copy in a bundle of standard copies by the user can be omitted. Furthermore, a storage memory for temporarily storing the insertion processing of a specific copy and an image applied with a specific processing becomes unnecessary. Moreover, in view of the fact that application of a specific processing to all the documents decline the copying speed if the specific processing is a time-consuming one, a more efficient copying operation can be achieved by adopting this method.

Figure 42:
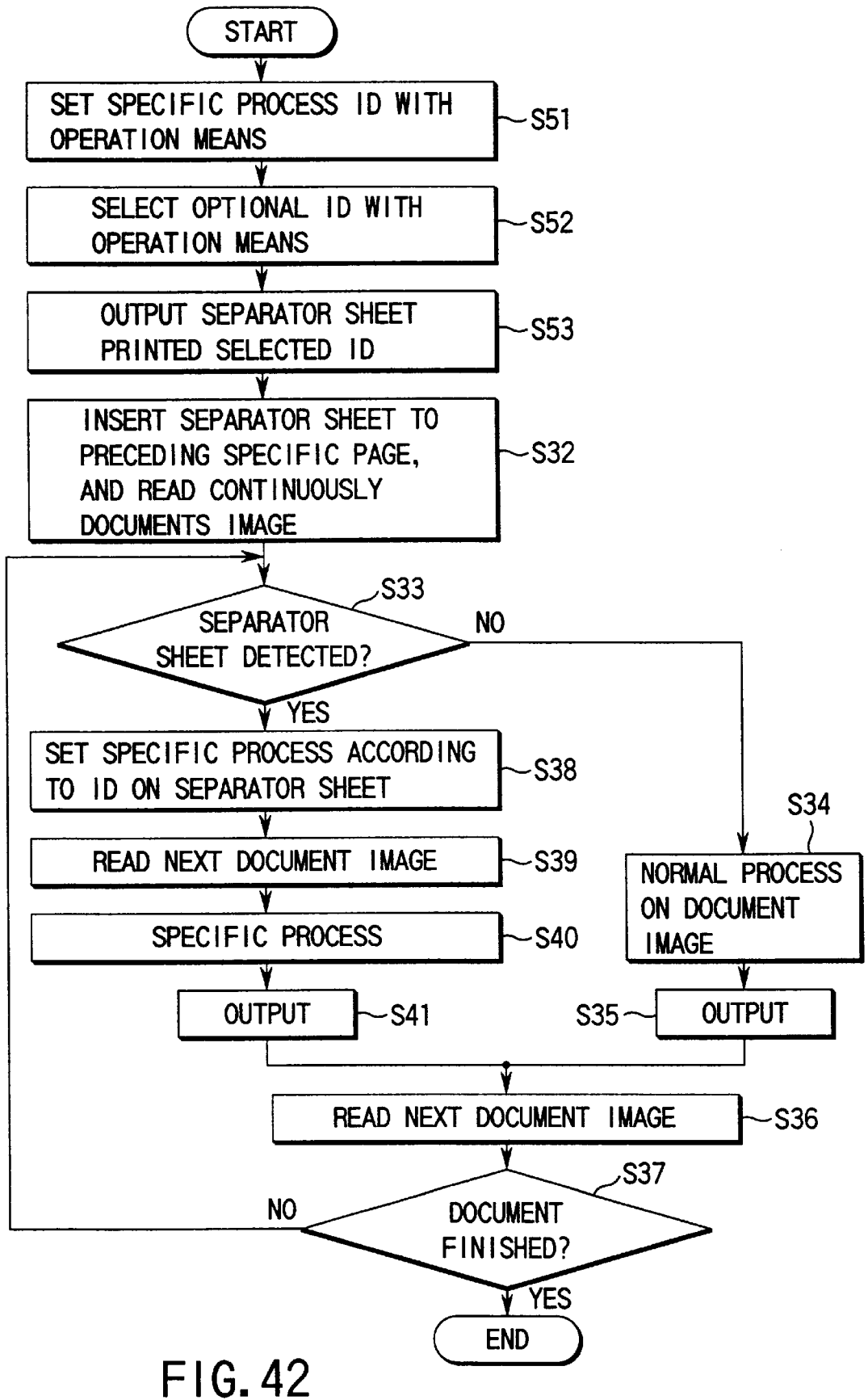
FIG. 42 is a flow chart for explaining the operation of the image forming apparatus of FIG. 1 in the case a specific processing is detected by an ID applied to a separation sheet.

(23) Operation explanation F: instructing a specific processing by an ID applied to a separation sheet inserted An example of applying a different image processing to one document from a plurality of documents set on the ADF (automatic document feeder) means 101 (for example, to apply a color image processing to the one document whereas a monochrome image processing is applied to the other documents) will be explained with reference to the flow chart of FIG. 42.

Step S51: A combination of desired image processing is formed by the operating means 103 of FIG. 1, and recognition information (ID) is matched with the combination. Further, parameter for each processing in the combination is set. The content of the setting is stored in the setting value storing means 104 as, for example, a table shown in FIG. 36.

Figures 43, 44:
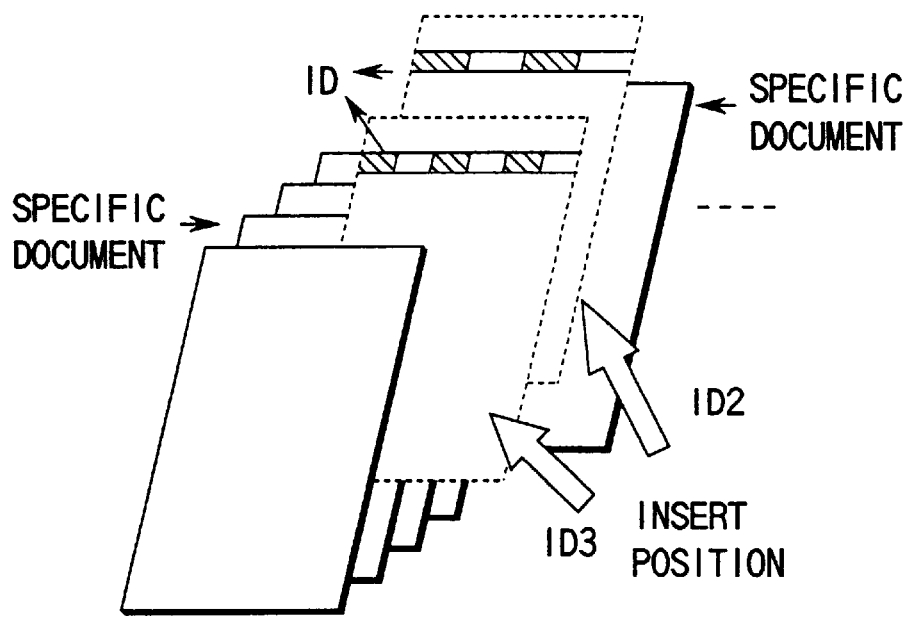
FIG. 43 is a table showing an example of storage in a table for storing combinations of image processing means provided in a setting value storing means, and the matching with IDs applied to the combinations.
FIG. 44 is a diagram for showing an example of a separation sheet where an ID pattern is printed.

As shown in FIG. 43, in the case one ID "1" is given to a combination of a high pass filtering processing, a γ correction processing, and a gradation processing, the parameter for each processing becomes the filter coefficient, the necessity/unnecessity of a processing, and a dither/error diffusion.

Steps S52 to S53: When the user selects an ID of a desired combination from the combinations of processing indicated on the operating means 103 and instruct the output of a separation sheet, the setting value storing means 104 develops the selected ID into a cyclic pattern as, for example, shown in FIG. 44 and supplies it to the outputting means 113 for printing on a predetermined paper so as to output a separation sheet.

Steps S32 to S37: The subsequent processing is substantially the same as FIG. 40, but differs in that the ID on the separation sheet is also detected by the separation recognition means when the separation sheet is recognized in the step S38, and the information of the detected ID is supplied to the setting value storing means 104.

The setting value storing means 104 supplies the combination of processing corresponding to the ID, the processing parameter, and the like to the image processing control means 6 based on the supplied information on the ID, and the image processing control means 6 switches to a processing to be applied to the next specific document and sets the parameter.

Accordingly, by applying an ID to a combination of desired image processing, printing the ID on a separation sheet, and inserting the appropriate separation sheet before a specific document in a document bundle, the instruction for the position of a specific document, and the specific processing for the specific copying can be simplified as well as labor of inserting a specific copy in a bundle of standard copies by the user can be omitted. Furthermore, flexible setting of an image processing as desired by the user can be achieved so that a labor for inserting a specific copy in a bundle of standard copies by the user can be saved. Moreover, a storage memory for temporarily storing the insertion processing of a specific copy and an image applied with a specific processing becomes unnecessary. Further, in view of the fact that application of a specific processing to all the documents decline the copying speed if the specific processing is a time-consuming one, a more efficient copying operation can be achieved by adopting this method.

Although the above-mentioned operation explanations A to F refer to an example of one job, the cases of plural jobs will be explained hereinafter. That is, in the case of finishing a plurality of copying jobs, conventionally they cannot be implemented at the same time so that each job needs to be conducted independently.

That is, the cases of finishing a plurality of jobs by one copying operation and sorting the copy outputs per each job will be explained in the below-mentioned operation explanations G to I.

(24) Operation explanation G: instructing the number of copies from the operating means and instructing the partition of jobs by a separation sheet Procedure 1: The copying number information necessary for a plurality of jobs are inputted from the operating means 103. For example, in the case the first 20 sheets are the job 1, the next 30 sheets are the job 2, and the remained 50 sheets are the job 3 out of 100 sheets, and 3 each copies are taken for each job, or 3 sets of the job 1, 5 sets of the job 2, and 10 sets of the job 3 are necessary, the information of the number of copies is inputted form the operating means 103. The inputted value is stored in the setting value storing means 104.

Figure 45:
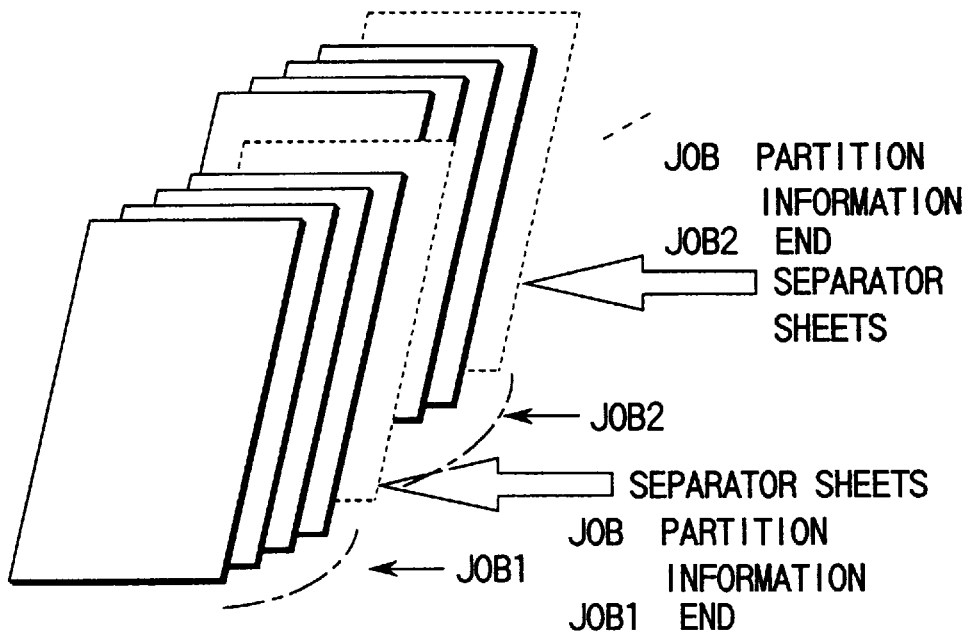
FIG. 45 is a diagram showing an example of partitioning a plurality of jobs with a separation sheet.
Figure 46:
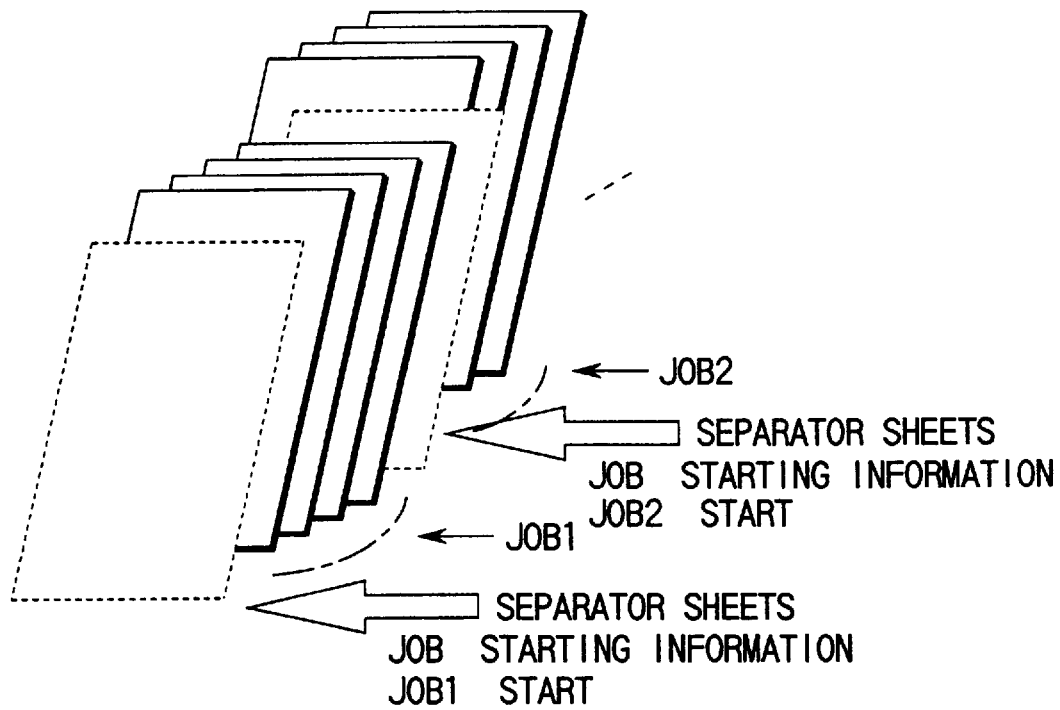
FIG. 46 is a diagram showing another example of partitioning a plurality of jobs with a separation sheet.

Procedure 2: For partitioning the jobs, or instructing the start of the subsequent job, separation sheets are inserted as shown in FIG. 45 and FIG. 46.

Procedure 3: An image of the document read by the ADF means 101 and the image reading means 102 is image-processed by the image processing means 107, outputted by the outputting means 113, and reading and output of the same document are repeated according to the job number information given by the operating means 103 and the setting value storing means 104.

The job sorting means 115 sorts the copies repeatedly outputted with the sorter.

Procedure 4: When the read image is recognized to be a separation sheet for indicating the partition/start of a job during the above-mentioned copying process by the separation sheet recognition means 105, the job sorting control means 115 is informed of the recognition of the partition/start of the job.

Figures 47, 48:
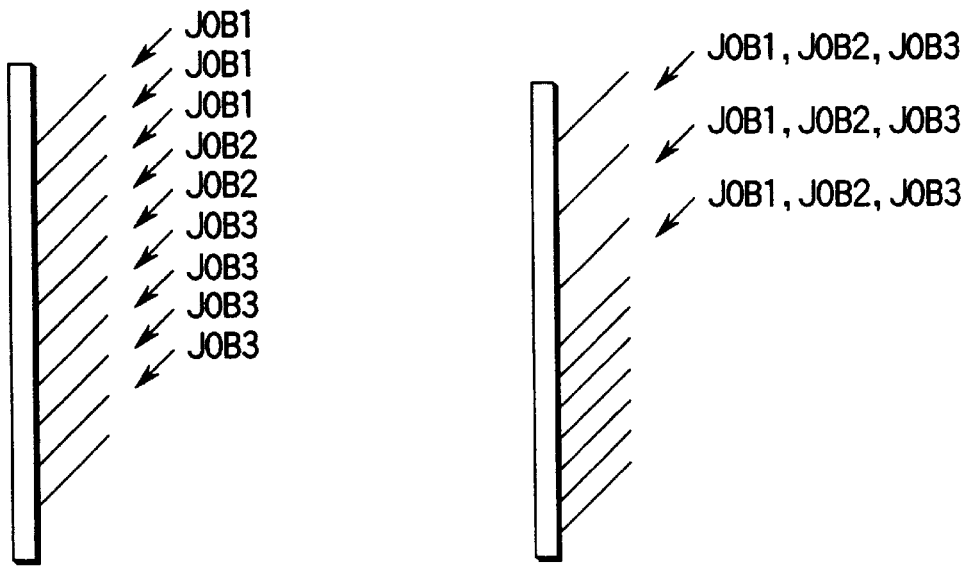
FIG. 47 is a diagram for explaining an example of a sorter function of a job sorting means.
FIG. 48 is a diagram for explaining another example of a sorter function of a job sorting means.

Procedure 5: The job sorting control means 115 controls the job sorting means 114 by the job partition/start information provided from the separation sheet recognition means 105 for the final finishing of the job (such as stapling), and starting the processing of the next job based on the copying number information provided form the operating means 103 and the setting value storing mean 104. Similarly, the job sorting means 114 continues sorting according to the instruction of the job sorting control means 115 for all the jobs (see FIG. 47, FIG. 48).

Accordingly, by instructing the copying number for each job from the operating means 103 and instructing the job partition/start by inserting a separation sheet in a document bundle, a batch copy processing of plural jobs can be conducted easily with the ADF means 101 by giving a simple instruction.

Figure 49:
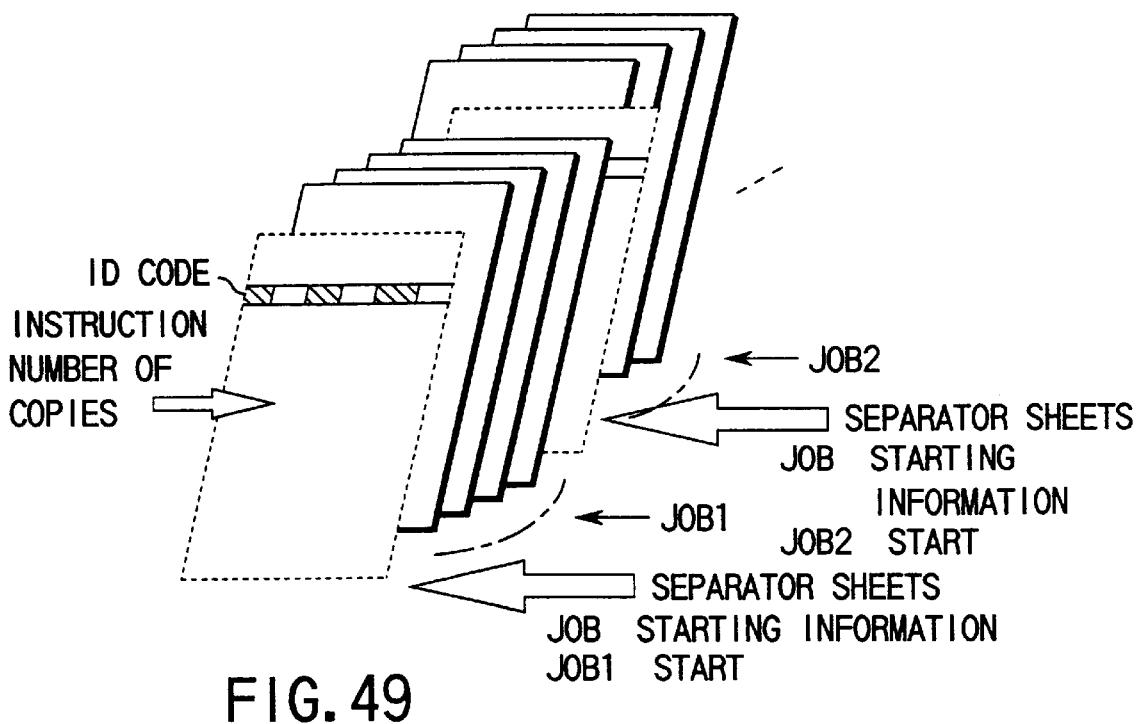
FIG. 49 is a diagram showing an example of instructing the partition of a plurality of jobs and the number of copies for each job by a separation sheet.
Figure 50:
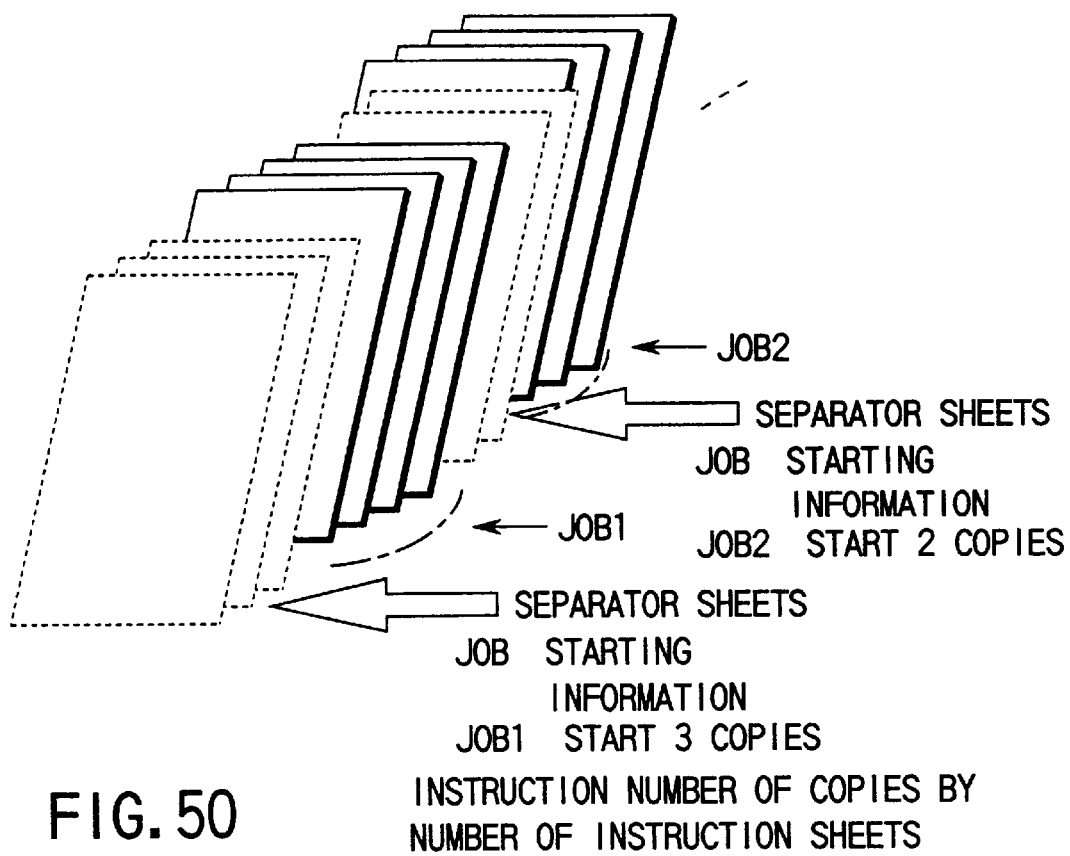
FIG. 50 is a diagram showing another example of instructing the partition of a plurality of jobs and the number of copies for each job by a separation sheet.

(25) Operation explanation H: instructing the job partition and the number of copies for each job Procedure 1: For example, in the case the first 20 sheets are the job 1, the next 30 sheets are the job 2, and the remained 50 sheets are the job 3 out of 100 sheets, and 3 each copies are taken for each job, or 3 sets of the job 1, 5 sets of the job 2, and 10 sets of the job 3 are necessary, start of each job is instructed by inserting a separation sheet at a position of starting each job. And the number of copies for each job is instructed by, for example, a cyclic pattern code (ID) printed on the separation sheet as shown in FIG. 49, or by inserting a necessary number of separation sheets as shown in FIG. 50.

Procedure 2: An image of the document read by the ADF means 101 and the image reading means 102 is image-processed by the image processing means 107, and if the image inputted by the separation sheet recognition means 5 is recognized to be a separation sheet for indicating the start of a job, the information and the copy number information are provided to the job sorting means 115 and the image inputting means 102.

Procedure 3: The image inputting means 102 repeats reading of the same document according to the copying number information. The job sorting control means controls the job sorting means 114 by the job starting information and the copy number information provided from the separation sheet recognition means 105.

Accordingly, by applying the copying number information (application of an ID representing the copying number, or insertion of separation sheets of the number the same as the necessary copying number) to a separation sheet, and inserting the separation sheet into a document bundle for instructing the start of each job and the copying number of each job, a batch copy processing of plural jobs can be conducted easily with the ADF means 101 by giving a simple instruction.

(26) Operation explanation I: instructing the job partition and the number of copies for each job (the case of a copier comprising an electronic sorter function)

Procedure 1: For example, in the case the first 20 sheets are the job 1, the next 30 sheets are the job 2, and the remained 50 sheets are the job 3 out of 100 sheets, and 3 each copies are taken for each job, or 3 sets of the job 1, 5 sets of the job 2, and 10 sets of the job 3 are necessary, start of each job is instructed by inserting a separation sheet at a position of starting each job. And the number of copies for each job is instructed by, for example, a cyclic pattern code (ID) printed on the separation sheet as shown in FIG. 49, or by inserting a necessary number of separation sheets as shown in FIG. 50.

Procedure 2: An image of the document read by the ADF means 101 and the image reading means 102 is image-processed by the image processing means 107 to be stored in the image storing means 10 via the image storage controlling means 9.

Procedure 3: When the read image is recognized to be a separation sheet for indicating the start of a job by the separation sheet recognition means 105, the information and the copying number information are provided to the job sorting control means 115 and the copy finishing control means 111.

Procedure 4: The copy finishing control means 111 controls the copy finishing means 112 according to the job start information and the copying number information, and the copy finishing control means 112 repeats reading of the same document according to the copying number information from the image recording means 10 and outputs it by the copy outputting means 13.

Figures 51, 52:
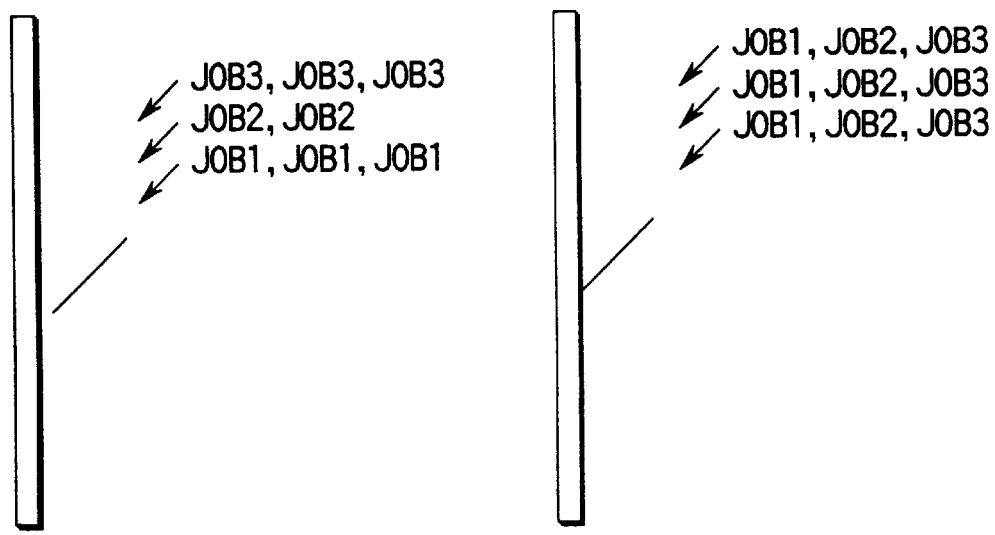
FIG. 51 is a diagram for explaining another example of a sorter function of a job sorting means.
FIG. 52 is a diagram for explaining still another example of a sorter function of a job sorting means.

Procedure 5: The job sorting control means 115 controls the job sorting means 114 by the job start information and the copying number information provided from the separation sheet recognition means 105, and the job sorting means 114 sorts the job accordingly (see FIG. 51, FIG. 52).

Accordingly, by applying the copying number information (application of an ID representing the copying number, or insertion of separation sheets of the number the same as the necessary copying number) to a separation sheet, and inserting the separation sheet into a document bundle for instructing the start of each job and the copying number of each job, a batch copy processing of plural jobs can be conducted easily with the ADF means 101 by giving a simple instruction.

Furthermore, since all the documents images, which are read and applied with a predetermined image processing are temporarily stored in the image storing means 110, and the same document image is read repeatedly from the image storing means 110 by the copy finishing means 112 (electronic sorter function) for finally outputting according to the copying number preliminarily instructed for each job, the mechanical sorter equipment is not required so that the management of the sorting order and the restraint of the noise generation caused by driving a scanner can be achieved.

(27) Operation explanation J: giving various kinds of instructions by the paper size of a separation sheet As already described in the explanation for the separation sheet recognition means 105, it is also possible to use a paper having a size different from that of the document to be copied for the various instructions such as the insertion instruction.

For example, for a document having the A4 size, a paper of a different size, that is, B5, A3, or a non-standard size, or A4R is preliminarily instructed from the operating means 103 as the separation sheet for registering it in the setting value storing means 104.

By using the paper having a size different from that of the document to be copied, registered as mentioned above as the separation sheet, even a standard paper can be used as a separation sheet.

(28) Operation explanation K: giving various kinds of instructions by the characteristic of a separation sheet As already described in the explanation for the separation sheet recognition means 105, it is also possible to use a paper or a medium having a characteristic different from that of the document to be copied for the various instructions such as the insertion instruction, the specific processing instruction, and the like.

For example, in the case of using a paper having a certain color is used as the separation sheet, as explained with reference to FIG. 14 and FIG. 15, the color characteristic and the instruction content are preliminarily registered in the setting value storage means 104 via the operating means 103.

For example, a red separation sheet is matched to an image processing for a photograph, and a blue separation sheet is matched to an unnecessary area deleting processing so that a paper with the color is used as a separation sheet.

Accordingly, a detailed instruction can be given. A further detailed instruction can be given by the combination of a paper size and a color.

Figure 53:
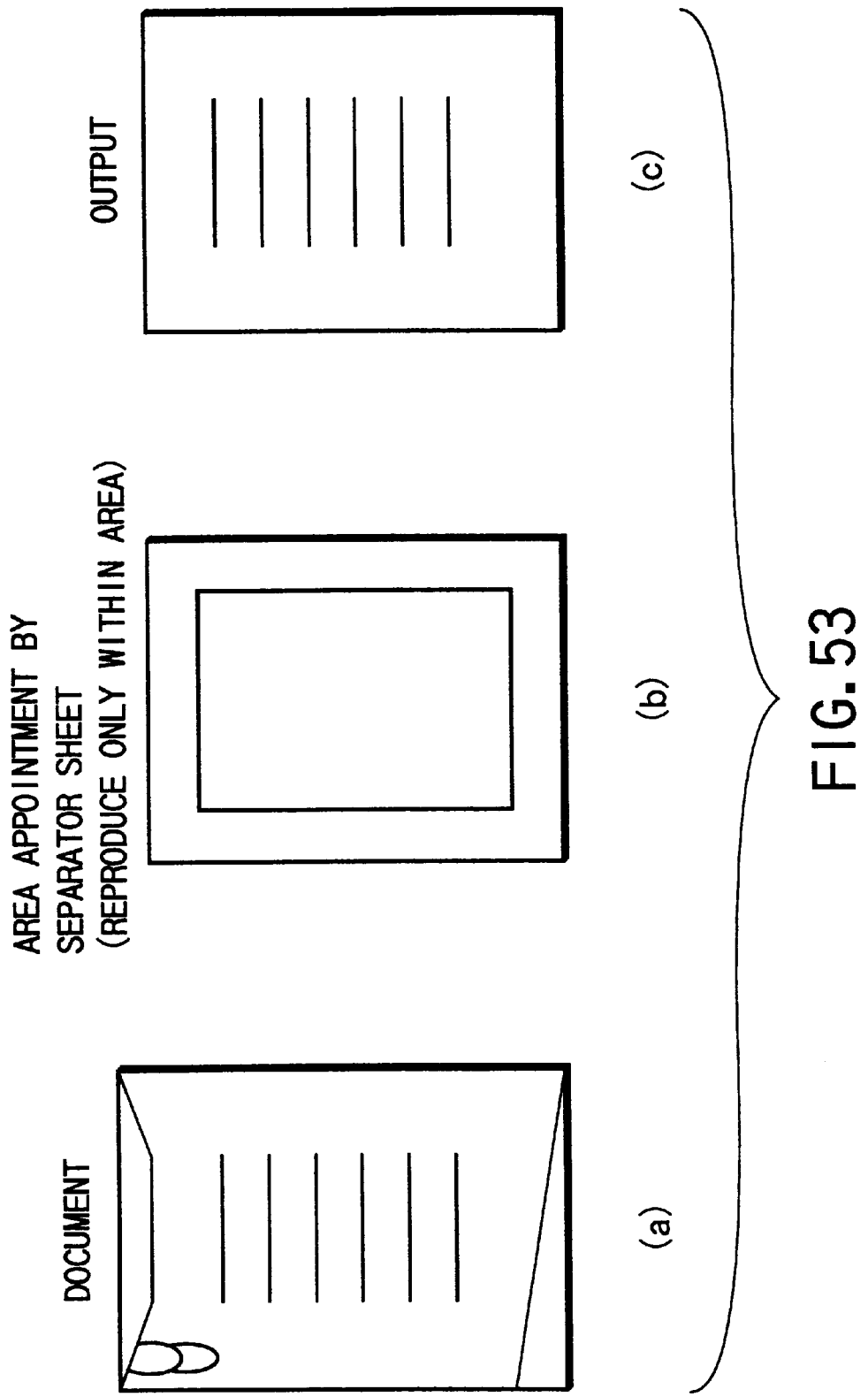
FIG. 53 is a diagram for explaining the case of appointing an area in a document by a separation sheet.

(29) Operation explanation L: appointing an area in a document by a separation sheet having a high transmissivity The case of giving various kinds of instructions using a certain characteristic of the operator sheet is explained in the operation explanation K, but it is also possible to use a medium having a high transmissivity as a separation sheet. Accordingly, instruction can be given not only per page but also for an appointed area in a document. For example, as shown in FIG. 53(*a*), (*b*), a medium having a high transmissivity is placed on a document, and a necessary area is marked with a marker with a characteristic to be used as a separation sheet. A corresponding processing is inputted from the operating means 103. With the separation sheet placed immediately before the document, reading-is conducted by the ADF, and the like so that the separation recognition means 105 recognizes the area in the separation sheet, informs it to the image processing control means 106. The image processing control means 106 conduct the processing instructed for the next document based on the information from the setting value storing means 104 and the separation sheet recognition means 105, then outputs it.

FIG. 46 shows an example of reproducing an image only in the area.

Accordingly, processing can be switched for each area in a document selectively.

Figure 54:
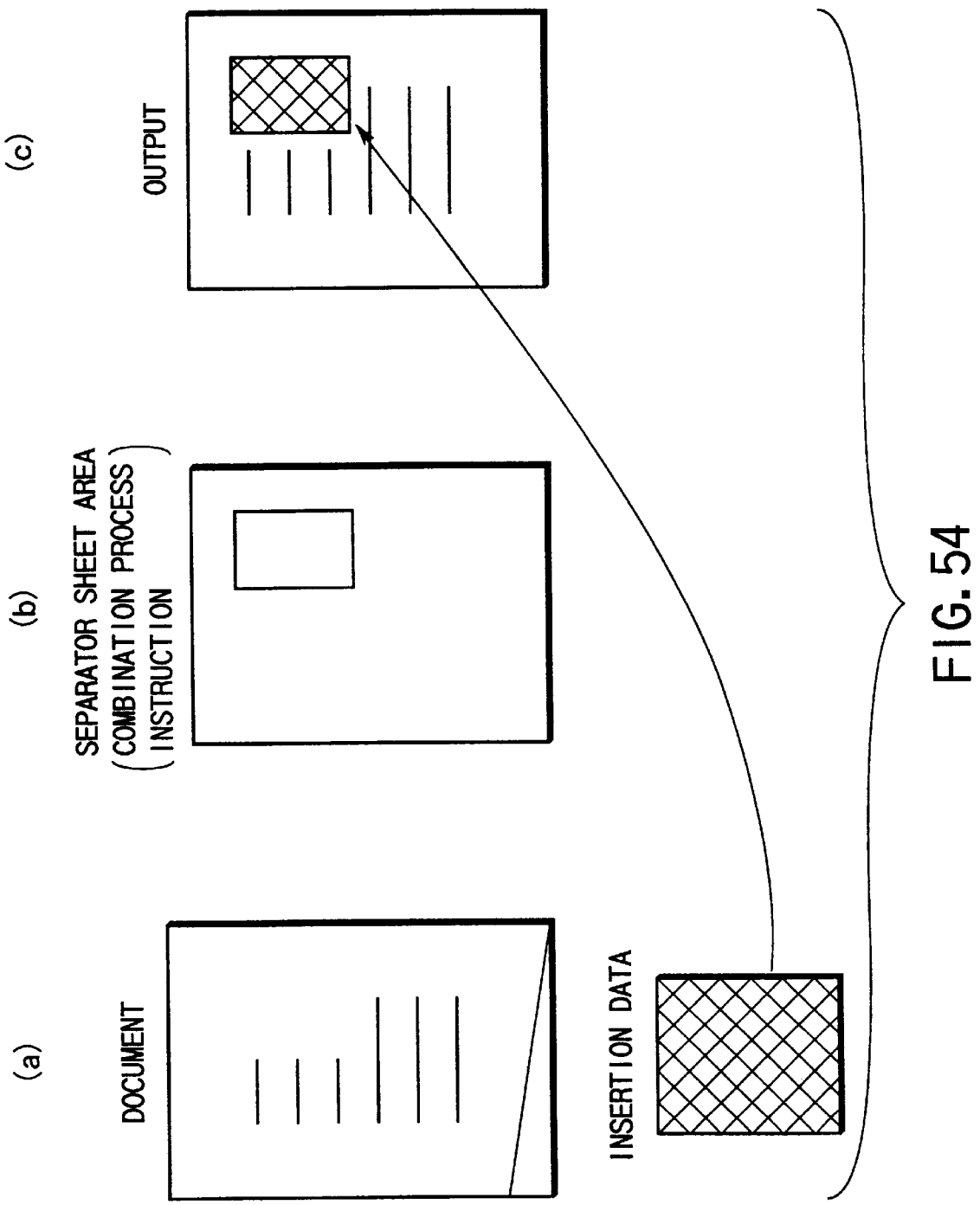
FIG. 54 is a diagram for explaining the case of appointing an area in a document by a separation sheet and combining certain data in the appointed area.

(30) Operation explanation M: instructing insertion/combination of data using a separation sheet The case of copying a plurality of document by the ADF means 101, and inserting, for example, data sent from the outside of the apparatus per page or per area will be explained with reference to FIG. 54.

Procedure 1: Insertion mode is instructed by the operating means 103 of FIG. 1.

Procedure 2: Data sent from the outside are stored in the image storing means 110 via the image storage controlling means 109.

Procedure 3: As described in the operation explanation L, a separation sheet having a high transmissivity is placed on a document, and an insertion area is appointed with a predetermined marker pen.

Procedure 4: With the separation sheet is placed immediately before the document, a plurality of documents are read continuously by the ADF means 101 and the image reading means 102, image-processed by the image processing means 107, and outputted form the outputting means 113 through the copy finishing means 112.

Procedure 5: When the separation sheet is recognized by the separation sheet recognition means 105, further, the size of the insertion area, and the like are recognized, and the information is advised to the image processing means 107 and the copy finishing control means 111. When the next document is read, corresponding data to be inserted are supplied from the image storing means 110 to the image processing means 107 via the image storage controlling means 109 at the same time.

The insertion data, which are optionally enlarged or reduced in the image area of the document appointed by the separation sheet in the image processing means, are combined and outputted from the outputting means 113.

Procedure 6: After finishing the insertion operation of the insertion data to the appointed area, the next document is read by the ADF means 101 and the image reading means 102 again, and a standard finishing is applied.

Accordingly, by using a separation sheet having a transmissivity higher than a standard paper, an area for inserting other data in the image read from the document or images can be appointed easily, and thus combination of desired data or images can be conducted during the copy processing of a plurality o documents easily at the same time.

(31) Operation explanation N: discharge of a document and a separation sheet

A method of discharging a separation sheet and a document separately by the ADF means 101 will be explained.

As explained with reference to FIG. 2, a document is fed out from the document placing table 12 by the conveyance belt 88 so as to be discharged to a document discharging portion 94 on the upper surface of the ADF 80 via the reversing roller 90, the flapper 91, and the paper discharging roller 92.

By controlling the rotation of the paper discharging roller, and a brake corresponding thereto, the discharging position can be controlled. For example, in the case of discharging a separation sheet, it can be discharged more strongly by accelerating the rotation speed of the rollers, or by alleviating the brake so that it is discharged to a position ahead in the discharging direction compared with the case of discharging a standard document. Accordingly, a separation sheet and a document can be discharged to different positions on the upper surface of the ADF 80.

Figure 55:
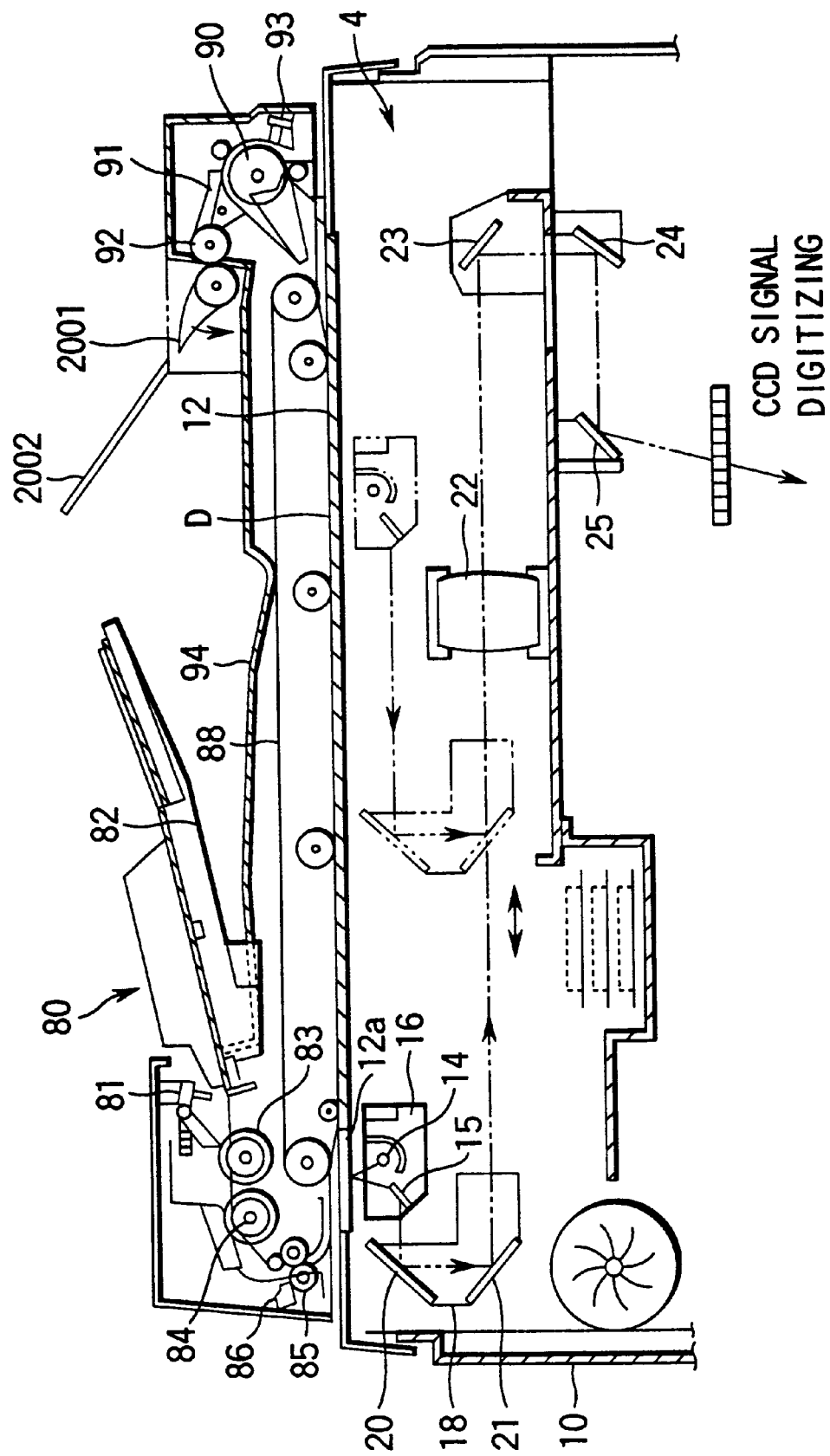
FIG. 55 is a diagram for explaining a mechanical configuration of an image forming apparatus of the embodiment for explaining the main part for discharging a separation sheet and a document independently.

Further, as shown in FIG. 55, a flapper 2001 and a separation sheet paper discharging tray 2002 are provided with the paper discharging route designed such that the flapper 2002 faces downward so as to discharge a document onto the upper surface of the ADF 80. For discharging the separation sheet, the paper discharging route is set such that the flapper 2001 is switched to the upward direction as shown in FIG. 55 so a to discharge a separation sheet onto the tray 2002.

(32) Operation explanation O: registration of a separation sheet

As mentioned above, a paper with a certain color or size can be registered as a separation sheet from the operating means 103, it is also possible to register a paper of a color or a size preferable for the user can be registered as the separation sheet.

Characteristic information such as a size, and the like is read from the separation sheet by a sensor in the image reading means 102 of FIG. 1, and judging information for judging it as a separation sheet is registered to the setting value storing means 104. The paper or a medium accordingly registered is used for recognizing a separation sheet by the separation sheet recognizing means 105 during the next copy processing.

For example, a separation sheet registering item is selected by the operating means 103. A paper to be registered as the separation sheet is fed onto the document table of the image reading means 102 by the ADF means 101 so that the width and length information of the paper is measured by the size detecting means explained with reference to FIGS. 7 to 11 for registering it as the separation sheet. Furthermore, the instruction content (insertion instruction, specific instruction, and the like) for the copier corresponding to the separation sheet can also be registered by the operating means 103.

Similarly, if a paper of a certain color can be registered in the setting value storing means 104 as a separation sheet using a color detecting means explained with reference to FIG. 14 and FIG. 15, a high transmissivity medium of FIG. 16 and FIG. 17 can be registered as a separation sheet.

Accordingly, not only one with a preferable characteristic can be registered as a separation sheet by the user, but also irregularity of the input system or a sensor can be absorbed to some extent so that a separation sheet can be recognized further accurately in the actual copying processing.

(33) Processing operation P: processing content detail output

After finishing copying processing of one job, if an instruction is given from the operation means 103 as the request from the user, the details of the processing content of the job can be read from the setting value storing means 104 for providing to the user.

Figure 56:
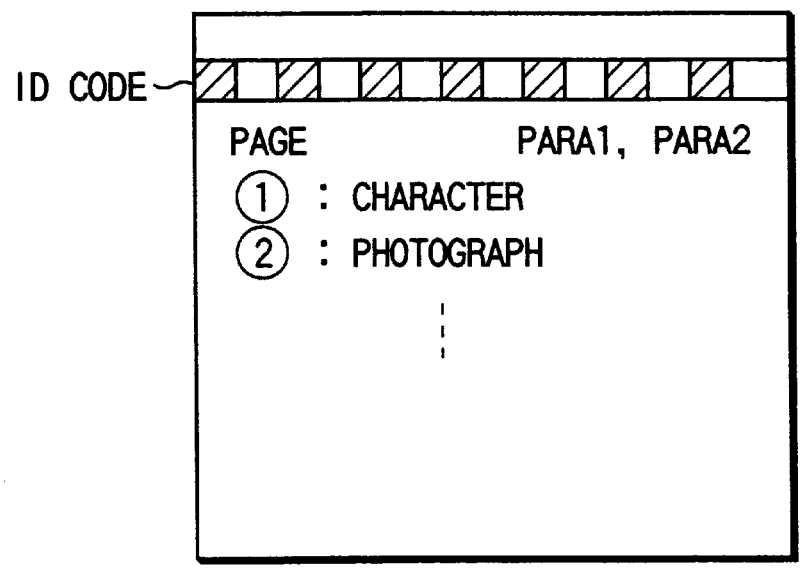
FIG. 56 is a diagram showing an example of outputting a set value stored in the setting value storing means in FIG. 1.

For example, the set value read from the setting value storing means 104 is bit-developed by the internal microcomputer to be outputted as shown in FIG. 56.

The content of the detailed information accordingly outputted is read form the image reading means 102 of FIG. 1 to be stored in the image filing means 117 of FIG. 1.

The content of the sheet of the detailed information stored in the image filing means 117 can be used at the time of finishing another job.

For example, if a sheet of detailed information stored in the image filing means 117 is selected by the operating means 103 at the time of starting a job, the content of the sheet of the selected detailed information is read from the image filing means 117 via the image file controlling means 116 and the image storage controlling means 109 to be stored in the image storing means 110. With the job started, the copy finishing means 112 reads the content of the sheet of the selected detailed information from the image storing means 110, conducts a predetermined setting for the copy finishing based on the content, and outputs it form the outputting means 113.

Unless a sheet of another detailed information stored in the image filing means 117 is newly selected, the setting the same as the previous job is applied in conducting the next job so that the same finishing can be conducted by only reading the document once more.

(34) Operation explanation Q: error output

Figure 57:
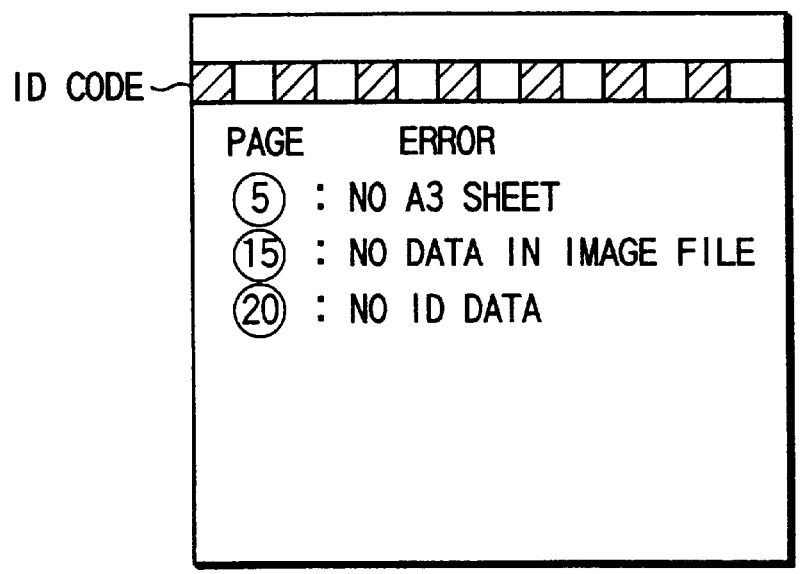
FIG. 57 is a diagram showing an example of outputting information on an error generated during the job operation.

If, for example, a setting error occurs while conducting one job, the detailed setting of the job can be read from the setting value storing means 104 to be bit-developed by the internal microcomputer. And further, the error can be analyzed with various sensors and judgments to be classified per page where an error is generated as shown in FIG. 57. The phenomenon, cause, and the like of the error can be indicated on the operating means 103, or printed on a predetermined paper (as the processing detail recording paper) to be outputted from the outputting means 113.

By referring to such an error message, the user can cope with the generated error easily.

As a cause of generating an error, for example,

Extreme setting of parameter (always having an output of white, or black regardless of the input image change)

Running out of the paper of the required size

Erasure of the required image information file from the files can be considered.

For example, if only one from a job is for the A3 output and the others are for the A4 output, and the A3 paper is run out, the information is outputted as an error.

(35) Operation explanation R: test printing

In finishing many number of copying, it is convenient if a test printing function is provided. Herein, the test printing processing procedure is explained herein.

Procedure 1: A predetermined instruction for the test printing is given from the operating means 103. A predetermined setting is conducted to the separation sheet recognition means 105 via the setting value storing means 104.

Procedure 2: Documents are read by the ADF means 101 and the image reading means 102, and separation sheets and the documents are discharged separately.

Procedure 3: A test printing is conducted, and at the same time, the detailed information of the job stored in the setting value storing means 104 is printed on a predetermined paper as shown in FIG. 56, and outputted from the outputting means 113.

Procedure 4: By observing the test printing, the user applies a predetermined mark to a corresponding portion to be corrected, if any, on the detailed information of the job printed on the outputted paper.

Procedure 5: The marked paper and a separation sheet for instructing the corresponding correction are read from the image reading means 102 (or setting by the operating means 103 is conducted). After changing the setting corresponding to the instructed part to be corrected, copy is conducted for the necessary number.

Accordingly, resources such as papers can be saved as well as the setting of a desired copying environment can be conducted easily.

(36) Operation explanation S: job skip at the time of error generation, and information of the error portion by a separation sheet If, for example, a setting error occurs while conducting one job, the conducted job and the document output can be skipped by inserting a separation sheet to the corresponding output part so that the content can be informed to the user by the processing detail recording paper or by the indication after finishing the job.

As a cause of generating an error,
Extreme setting of parameter (always having an output of white, or black regardless of the input image change)
Running out of the paper of the required size
Erasure of the required image information file from the files can be considered.

For example, if only one from a job is for the A3 output and the others are for the A4 output, and the A3 paper is run out, a separation sheet is inserted to the position and the next document or job is conducted.

After the processing, the above-mentioned processing detail recording paper is outputted from the outputting means 113 based on the information stored in the setting value storing means 104.

As a separation sheet, a separation sheet can be set in one paper tray, or a paper different from the document to be copied can be inserted. For example, in this case, only one document is A3 and the others are A4, and the A3 paper is run out so that a paper larger than the A4 size, that is, B4, or A4R can be used.

Accordingly, in the case an error is generated while conducting a job, by inserting and outputting a separation sheet having an error message printed thereon, the job can be conducted without interruption even when an error occurs. Further, since the error portion can be found easily, the user only needs to conduct the copy finishing for the document with the error.

(37) Operation explanation T: error handling measure using an image storage memory If, for example, a setting error occurs while conducting one job, an image of documents with a normal arrangement is stored in the image storing means 110 without outputting the copy of document of the job, and after finishing the job, the content of the error is informed to the user by the processing detail recording paper or the indication.

As a cause of generating an error, the above-mentioned various factors can be considered.

The user copes with the generated error based on the informed error message. This can be done either after finishing the job, or by interruption.

When the user corrects the error setting and input the document by the image reading means 102 again, the image processing control means 106 controls the image processing means 107 based on the new setting. The image processing means 107 proceeds the processing according to the instruction. The copy finishing means 112 inserts the image to the corresponding position in the other preliminarily stored processed documents, and outputs them.

Accordingly, particularly in outputting plural sets of copies, an efficient copy finishing without waste can be achieved.

(38) Operation explanation U: error handling measure using an image delay memory/image storing memory If, for example, a setting error occurs while conducting one job, an image of documents with a normal arrangement is stored in the image storing means 110 without outputting the copy of document of the job, and only the image of the document with the error is stored in the image delay means 108 as the scan (raw) image data without applying the image processing, then the content thereof is informed to the user by the screen indication or the paper output.

After finishing the job, the content of the generated error is advised by the user by the processing detail recording paper or the indication.

As a cause of generating an error, the above-mentioned various factors can be considered.

The user copes with the generated error based on the informed error message. This can be done either after finishing the job, or by interruption.

When the user corrects the error setting again, the image processing control means 106 controls the image processing means 107 based on the new setting. The image processing means 107 reads the image with the error from the image delay means 108, and conducts the processing according to the instruction by the image controlling means 106. The copy finishing means 112 inserts the image to the corresponding position in the other preliminarily stored processed documents, and outputs them.

Accordingly, particularly in outputting plural sets of copies, an efficient copy finishing without waste can be achieved. Further, the copy finishing can be conducted easily by only re-setting for the document with the error.

(39) Operation explanation V: error handling measure using a buzzer, or a separation sheet If, for example, a setting error occurs while conducting one job, the job can be temporarily stopped so that the generation of the error can be informed to the user by operating a buzzer provided in the operating means 101. At the time, the reason of the error setting, and the like are indicated on the screen of the operating means 103 or by the paper output. In the case the user does not respond to it within a predetermined time, the job is skipped by inserting a separation sheet to the corresponding output part so that the generation of the error can be informed, and conduct the next job.

Accordingly, since the generated error can be dealt with on the spot in the case the user is beside the apparatus, the burden of the user can be alleviated so that the finishing can be conducted smoothly. And further, since the next job can be conducted in a predetermined time, it is advantageous in that another user does not have to wait for a long time.

(40) Operation explanation W: measure for discharging a separation sheet and a document at the time of the error generation In the operation explanation N, separate discharging of the documents and the separation sheets by the ADF means 101 in giving various instructions with a separation sheet, such as the position of a specific document in a document bundle, insertion of a specific copy, and sorting. On the other hand, when an error is generated, by skipping the job and discharging the separation sheet to a document tray, and discharging the document to another tray, the error document can be appointed easily. By re-setting only for the error document discharged on another tray, and optionally re-inputting the document, the copy can be finished.

(41) Operation explanation X: instructing a test printing with a separation sheet, a test printing of only a specific document In finishing many number of copying, it is convenient if a test printing function is provided. However, if there are many documents to be test-printed, a long time is necessary for the test printing of the all the documents, and also a long time and considerable labor are needed for checking the outputted test printing.

Therefore, with a separation sheet inserted before the document to be test-printed, the document bundle is read by the ADF means 101 and the image reading means 102, applied with an necessary image processing by the image processing means 107, and temporarily stored in the image storing means 110.

If the image read by the separation sheet recognition means 5 is recognized to be a separation sheet, a test printing is conducted by the outputting means 113 while storing the subsequent document or job in the image storing means 110.

After checking the test printing by the user, the image of all the documents are read from the image storing means 110 by the copy finishing means 112 and outputted for the needed sets in the case reset is not required.

Accordingly, for example, a test printing of only a specific document can be conducted.

Furthermore, it is also possible to conduct a test printing of only a document of a high complexity (for example, processing a plurality of documents for one copy (such as many in one)) based on the complexity of the document detected by the auto recognition means 119 of FIG. 1.

In this case, the document is read by the ADF means 101 and the image reading means 102, applied with the necessary image processing by the image processing means 107, and temporarily stored in the image storing means 10. An image of a document with a complicated combination processing by a separation sheet, or a document or a job judged to be of a high complexity by the auto recognition means 119 is stored in the image storing means 110 so as to conduct the test printing by the outputting means 113. After checking the test printing by the user, the image of all the documents are read from the image storing means 10 by the copy finishing means 12 and outputted for the needed sets in the case reset is not required.

At the time, if the user's setting and the detection by the auto recognition means 119 are extremely different, processing can be conducted in both user's setting and internal auto recognition setting. The test printing thereof, processing details, and a warning are outputted or indicated so that the user can select one therefrom.

As heretofore explained, according to the present invention, the instruction of the copy processing desired by the user, and the recognition processing of the instruction content can be simplified to improve the convenience for the user. Furthermore, the cost reduction and the acceleration of the processing speed can be achieved to improve the productivity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image forming apparatus comprising:

means for making a setting for recognizing a separation sheet upon receipt of a forming instruction of an image and a test printing instruction;

first reading means for reading an image on an original by use of an ADF and an image reading section, and discharging the separation sheet and the original separately;

outputting means for testing for printing on the basis of the read image and, printing on an instruction sheet detailed information on a job for which the setting is made by the setting means, so as to output the instruction sheet along with a test copy;

second reading means for, when a user has determined that there is a correction necessary to be made to the test copy and placed a predetermined mark at a position corresponding to the correction on the instruction sheet output with the detail information thereon by the outputting means, reading the instruction sheet;

third reading means for reading a separation sheet inserted to indicate the correction in accordance with the instruction sheet read by the second reading means; and means for, after adjusting the setting of the setting means on the basis of the instruction sheet read by the second reading means and the separation sheet read by the third reading means, performing image formation by making a necessary number of copies on the basis of the image read by the first reading means.

2. An image forming apparatus comprising:

means for, upon receipt of image information and a forming instruction of an image, testing for image forming in accordance with part of the forming instruction and outputting the formed image;

means for reading an instruction sheet which gives an instruction for a necessary correction to be made to the formed image that has been output from the test means; and means for adjusting, in accordance with the instruction read by the reading means, a setting that has been made on the basis of the forming instruction, and forming the image by use of the image information on the basis of the adjusted setting;

wherein the reading means includes means for preliminarily registering a size of the instruction sheet; and means for recognizing the instruction sheet from a group of documents and the instruction sheet based on a size registered by the registering means.

3. An image forming apparatus according to claim 2, wherein the reading means includes means for recognizing the instruction sheet from the group of documents and the instruction sheet based on a paper characteristic registered by the registering means.

4. An image forming apparatus according to claim 1, wherein the second reading means includes means for preliminarily registering a size of the instruction sheet; and means for recognizing the instruction sheet from a group of documents and the instruction sheet based on a size registered by the registering means.

5. An image forming apparatus according to claim 1, wherein the second reading means includes means for preliminarily registering a size of the instruction sheet; and means for recognizing the instruction sheet from a group of documents and the instruction sheet based on a paper characteristic registered by the registering means.

6. An image forming apparatus according to claim 1, wherein the second reading means includes means for reading a pattern and processing a certain area based thereon when the instruction sheet is of a high transmissivity having the pattern for appointing the certain area.

7. An image forming apparatus according to claim 1, wherein the second reading means includes means for reading an image of the instruction sheet; and means for reading a pattern and processing an image of the instruction sheet according to a certain area when the instruction sheet is of a high transmissivity having the pattern for appointing the certain area.

8. An image forming apparatus comprising:

means for reading an instruction sheet including a content of a process to be executed;

means for forming an image in accordance with the content of the process read by the reading means; and means for outputting a sheet indicating an error to an output position indicated by the instruction sheet when the process whose content has been read by the reading means is not executable;

wherein the reading means includes means for preliminarily registering a size of the instruction sheet; and means for recognizing the instruction sheet from a group of documents and the instruction sheet based on a size registered by the registering means.

9. An image forming apparatus according to claim 8, wherein the reading means includes means for recognizing the instruction sheet from the group of documents and the instruction sheet based on a size registered by the registering means.

* * * * *